US012700781B2

(12) United States Patent
Kori et al.

(10) Patent No.: US 12,700,781 B2
(45) Date of Patent: Aug. 4, 2026

(54) ROTOR MANUFACTURING METHOD

(71) Applicant: AISIN CORPORATION, Kariya (JP)

(72) Inventors: Motoki Kori, Kariya (JP); Tomoi Kojima, Kariya (JP); Toshiyuki Saburi, Kariya (JP); Yohei Oya, Kariya (JP)

(73) Assignee: AISIN CORPORATION, Kariya (JP)

( * ) Notice: Subject to any disclaimer, the term of this patent is extended or adjusted under 35 U.S.C. 154(b) by 176 days.

(21) Appl. No.: 18/031,211

(22) PCT Filed: Oct. 30, 2020

(86) PCT No.: PCT/JP2020/040986
§ 371 (c)(1),
(2) Date: Apr. 11, 2023

(87) PCT Pub. No.: WO2022/091390
PCT Pub. Date: May 5, 2022

(65) Prior Publication Data
US 2023/0387767 A1      Nov. 30, 2023

(30) Foreign Application Priority Data

Oct. 29, 2020     (JP) ................................. 2020-181917

(51) Int. Cl.
*H02K 15/12*          (2025.01)
*B29C 45/14*          (2006.01)
(Continued)

(52) U.S. Cl.
CPC ....... *H02K 15/12* (2013.01); *B29C 45/14344* (2013.01); *H02K 1/27* (2013.01);
(Continued)

(58) Field of Classification Search
CPC ... H02K 15/12; H02K 15/03; B29C 45/14344
See application file for complete search history.

(56) References Cited

U.S. PATENT DOCUMENTS 5,418,313 A * 5/1995 Smith .................... C08G 59/18
528/124
9,947,464 B2      4/2018 Nagai et al.
(Continued)

FOREIGN PATENT DOCUMENTS

EP          4 178 093 A1     5/2023
JP      2006246560 A  *  9/2006
(Continued)

OTHER PUBLICATIONS

Resin Curing Temperature—Powerblanket retrieved from <https://www.powerblanket.com/blog/resin-curing-temperature/> on May 21, 2025. (Year: 2018).*
(Continued)

*Primary Examiner* — Susan D Leong
*Assistant Examiner* — Vipul Malik
(74) *Attorney, Agent, or Firm* — Oliff PLC

(57) ABSTRACT
A rotor manufacturing method for manufacturing a rotor of a rotary electric machine by disposing magnets in hole portions of a rotor core formed of stacked steel sheets, and injecting and curing a thermosetting resin to fix the magnets to the rotor core includes a temperature increasing step for increasing a temperature of the rotor core to a curing start temperature or higher, a resin injection step for causing a resin injection apparatus to inject the liquid resin at a melting start temperature or higher into the hole portions of the rotor core at the curing start temperature or higher, and a magnet fixing step for curing the resin by keeping the rotor core at the curing start temperature or higher.

4 Claims, 19 Drawing Sheets

(51) Int. Cl.

| | |
|---|---|
| *B29K 101/10* | (2006.01) |
| *B29K 705/12* | (2006.01) |
| *B29L 31/00* | (2006.01) |
| *H02K 1/27* | (2022.01) |
| *H02K 15/03* | (2025.01) |

(52) U.S. Cl.

CPC .......... *H02K 15/03* (2013.01); *B29K 2101/10* (2013.01); *B29K 2705/12* (2013.01); *B29K 2995/0008* (2013.01); *B29L 2031/749* (2013.01)

(56) References Cited

U.S. PATENT DOCUMENTS

| | | | |
|---|---|---|---|
| 10,283,264 B2 | 5/2019 | Nagai et al. | |
| 2010/0083486 A1* | 4/2010 | Amano .................. | H02K 1/276 |
| | | | 29/609 |
| 2013/0234363 A1 | 9/2013 | Nagai et al. | |
| 2014/0327329 A1 | 11/2014 | Kitada | |

| | | | | |
|---|---|---|---|---|
| 2018/0204676 A1 | 7/2018 | Nagai et al. | | |
| 2019/0044423 A1* | 2/2019 | Fukuyama | ............... | H02K 1/28 |
| 2019/0315027 A1 | 10/2019 | Sugiyama | | |

FOREIGN PATENT DOCUMENTS

| | | | | |
|---|---|---|---|---|
| JP | 2008-42967 | A | | 2/2008 |
| JP | 2012161209 | A | * | 8/2012 |
| JP | 2012-228032 | A | | 11/2012 |
| JP | 5373269 | B2 | | 12/2013 |
| JP | 2014-217137 | A | | 11/2014 |
| JP | 2015-180187 | A | | 10/2015 |
| JP | 2016-182032 | A | | 10/2016 |
| JP | 2019115170 | A | * | 7/2019 |

OTHER PUBLICATIONS

Jan. 9, 2024 Extended Search Report issued in European Patent Application No. 20959905.9.

Dec. 8, 2020 International Search Report issued in International Patent Application No. PCT/JP2020/040986.

* cited by examiner

START

STEEL SHEET STACKING STEP — S1

MAGNET DISPOSING STEP — S2

JIG ATTACHING STEP — S3

TEMPERATURE INCREASING STEP — S4

INJECTION APPARATUS PLACEMENT STEP — S5

RESIN INJECTION STEP — S6

MAGNET FIXING STEP — S7

JIG DETACHING STEP — S8

COOLING STEP — S9

END (a)

(b)

ROTOR MANUFACTURING METHOD

TECHNICAL FIELD

The present technology relates to a rotor manufacturing method for manufacturing a rotor of a rotary electric machine.

BACKGROUND ART

In general, an interior permanent magnet (IPM) motor is used as a rotary electric machine mounted on a vehicle such as a hybrid vehicle or an electric vehicle. It is proposed that, when manufacturing a rotor of such a rotary electric machine, a rotor core (stacked iron core) is formed by stacking stacked steel sheets with holes, magnets are inserted into the holes, and the magnets are fixed to the rotor core by preheating the rotor core, injecting a thermosetting resin into the holes of the rotor core, and mainly heating the rotor core, thereby obtaining a rotor having the magnets embedded in the rotor core (see Patent Document 1).

RELATED ART DOCUMENTS

Patent Documents

Patent Document 1: Japanese Patent No. 5373269 (JP 5373269 B)

SUMMARY OF THE DISCLOSURE

Problem to be Solved by the Invention

Since the rotor core is formed by stacking the stacked steel sheets as described above, a problem arises in that the resin may leak from a gap between the stacked steel sheets when a stay period of the molten resin until the resin is cured in the main heating is long after the molten resin is injected into the holes of the rotor core even if the rotor core is urged while being interposed in a jig or the like.

Therefore, it is an object to provide a rotor manufacturing method capable of preventing the resin from leaking between the stacked steel sheets when the resin is injected into hole portions of the rotor core.

Means for Solving the Problem

The rotor manufacturing method is
a rotor manufacturing method for manufacturing a rotor
  of a rotary electric machine by using a thermosetting
  resin having a characteristic that the resin is solid at
  room temperature, liquefied by being heated to a melt-
  ing start temperature or higher, and cured by being
  heated to a curing start temperature or higher, disposing
  magnet members in hole portions of a rotor core
  formed of stacked steel sheets, and injecting and curing
  the resin to fix the magnet members to the rotor core.
The rotor manufacturing method includes:
a temperature increasing step for increasing a temperature
  of the rotor core to the curing start temperature or
  higher;
a resin injection step for causing a resin injection appa-
  ratus to inject the liquid resin at the melting start
  temperature or higher into the hole portions of the rotor
  core at the curing start temperature or higher; and
a magnet fixing step for curing the resin by keeping the
  rotor core at e curing start temperature or higher.

When the resin is injected into the hole portions of the rotor core, the resin in contact with the hole portions is cured at the curing start temperature or higher. Thus, the resin can be prevented from leaking between the stacked steel sheets.

MODES FOR CARRYING OUT THE DISCLOSURE

First Embodiment

A first embodiment will be described below with reference to the drawings.

[Schematic Structure of Rotor]

Figure 2:
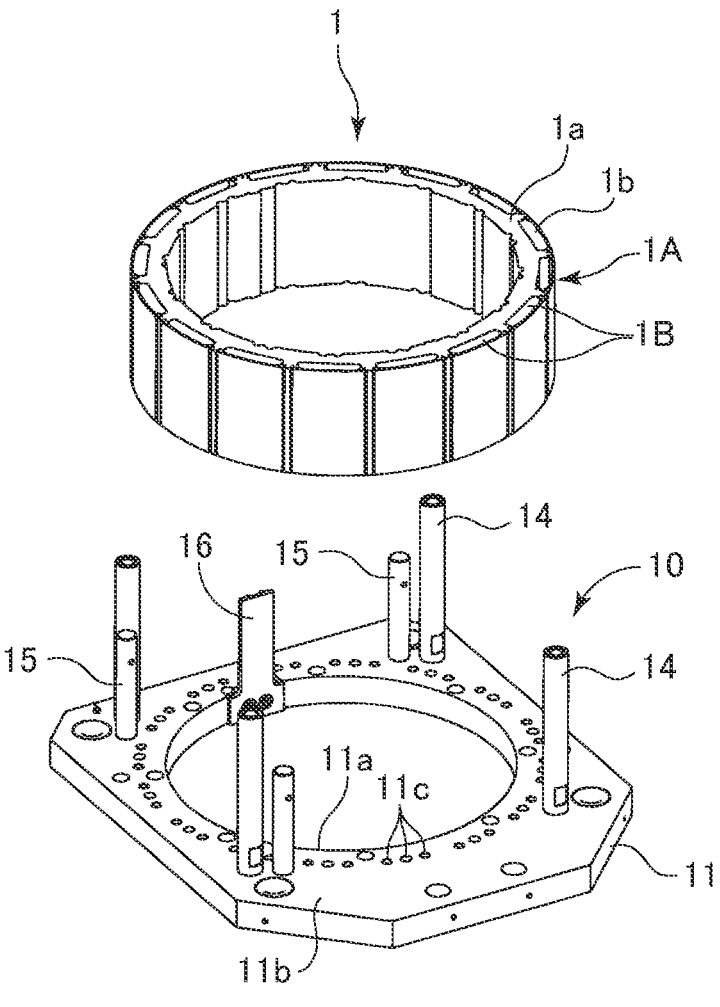
FIG. 2 is a perspective view showing a rotor core and a lower plate of a holding jig.
Figure 3:
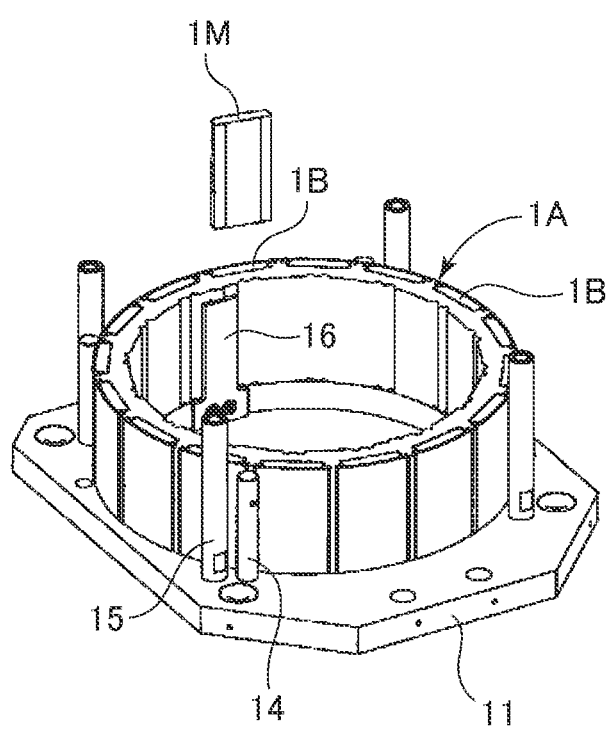
FIG. 3 is a perspective view showing a state in which the rotor core is placed on the lower plate of the holding jig.

First, brief description will be given of the structure of a rotor in, for example, a drive motor (rotary electric machine) of a hybrid drive system or an electric vehicle. The drive motor broadly includes a stator (stationary element) and a rotor 1 (rotary element). As shown in FIG. 2, the rotor 1 includes a rotor core 1A formed by stacking stacked steel sheets 1a each having a plurality of holes 1b formed by press working or the like. A plurality of hole portions 1B is formed in the rotor core 1A by stacking the stacked steel sheets 1a in a stacking direction with the holes 1b aligned in phase. As shown in FIG. 3, magnets 1M serving as magnet members are inserted and disposed in the hole portions 1B, respectively. In this state, the magnets 1M are fixed to the respective hole portions 1B with a resin, thereby forming the rotor 1 having the magnets 1M embedded in the rotor core 1A.

[Outline of Rotor Manufacturing Method]

Figure 1:
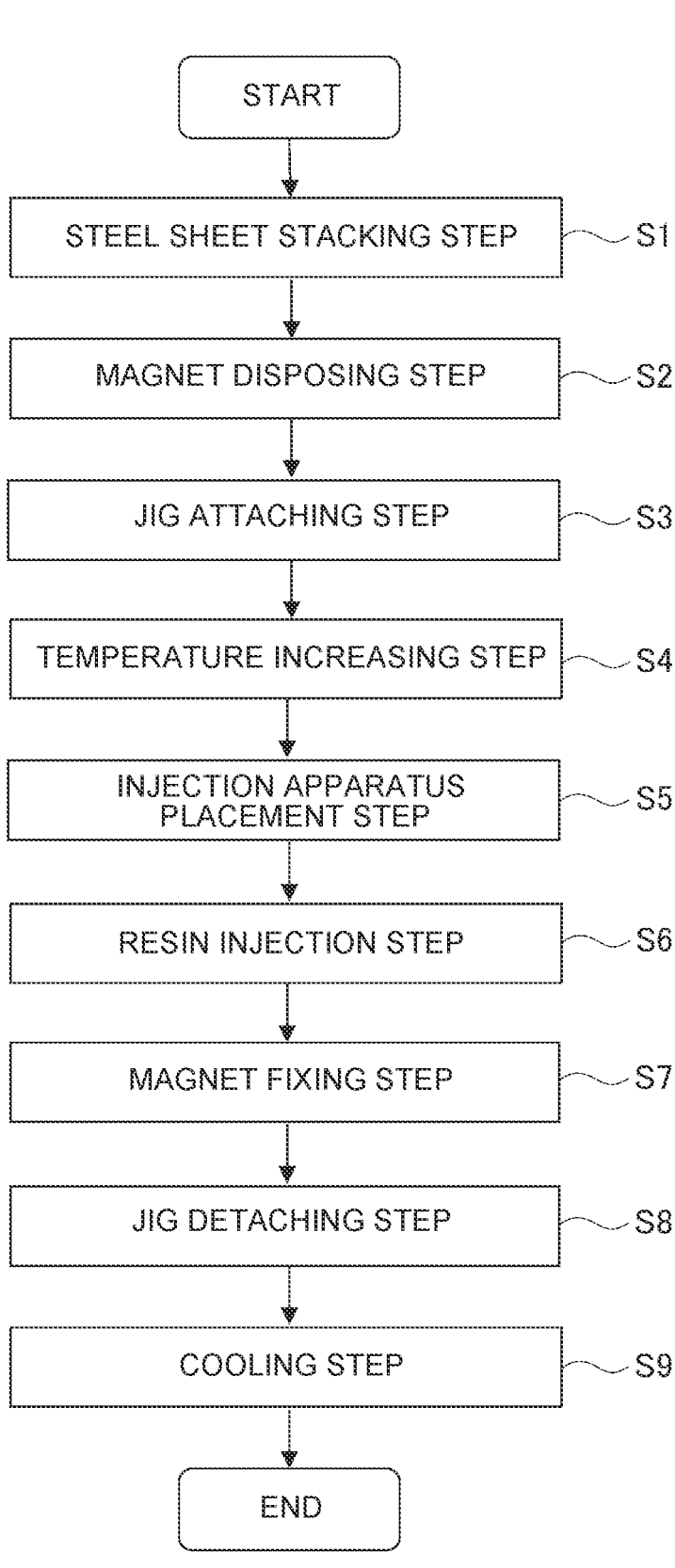
FIG. 1 is a flowchart showing steps of a rotor manufacturing method according to a first embodiment.

Next, an outline of a rotor manufacturing method according to the first embodiment will be described. As shown in FIG. 1, the rotor manufacturing method includes a steel sheet stacking step S1 for stacking the stacked steel sheets 1a to form the rotor core 1A, a magnet disposing step S2 for inserting and disposing the magnets 1M in the hole portions 1B of the rotor core 1A, and a jig attaching step S3 for attaching a holding jig 10 to the rotor core 1A. The rotor manufacturing method further includes a temperature increasing step S4 for increasing the temperature of the rotor core 1A, an injection apparatus placement step S5 for placing the rotor core 1A on a resin injection apparatus 30 for injecting a resin, and a resin injection step S6 for causing the resin injection apparatus 30 to inject, the resin into the hole portions 1B of the rotor core 1A. The rotor manufacturing method further includes a magnet fixing step S7 for fixing the magnets 1M to the rotor core 1A by curing the injected resin, a jig detaching step S8 for detaching the holding jig 10 from the rotor core 1A, and a cooling step S9 for cooling the rotor core 1A. These steps are sequentially performed in a factory line while moving the rotor core 1A by, for example, a belt conveyor. When stacking the stacked steel sheets 1a in the steel sheet stacking step ST described later, an operator performs adjustment. In the other steps, the conveyance of the rotor core 1A, the attachment and detachment of the holding jig 10, and the like are performed by factory equipment such as articulated robots.

[Details of Steel Sheet Stacking Step]

First, details of the steel sheet stacking step S1 will be described with reference to FIG. 2. As shown in FIG. 2, the rotor core 1A is formed, for example, by press working into a hollow disc shape that is point-symmetrical about the center. The rotor core 1A is formed by stacking the stacked steel sheets 1a each having the plurality of holes 1b while sequentially laying the stacked steel sheets 1a on an upper surface 11b of a lower plate 11 of the holding jig 10 detailed later. The stacked steel sheets 1a have a slight, tolerance. Therefore, the operator stacks the stacked steel sheets 1a while adjusting the phase in a circumferential direction of the hollow disc shape. Thus, the stacked steel sheets 1a are stacked so that the uppermost stacked steel sheet 1a has less inclination with respect to a plane orthogonal to the stacking direction (that is, a horizontal direction). The stacked steel sheets 1a may be stacked on the upper surface 11b of the lower plate 11 of the holding jig 10 as described above, or may be stacked at a different place to form the rotor core 1A and then placed on the upper surface 11b of the lower plate 11 of the holding jig 10.

The lower plate 11 of the holding jig 10 is a hollow plate-shaped member having a hole 11a formed at the center. A support plate 16 for positioning and supporting the rotor core 1A is fixed to the hole 11a. First shafts 14 and second shafts 15 shorter than the first shafts 14 are provided upright, for example, at four positions on the lower plate 11. Therefore, when the rotor core 1A is placed on the upper surface 11b of the lower plate 11, the support plate 16 abuts against a part of the inner peripheral surface of the rotor core 1A, and the second shafts 15 abut against a part of the outer peripheral surface. Thus, the rotor core 1A is supported on the lower plate 11 while restricting horizontal movement and determining the relative positions of the lower plate 11 and the rotor core 1A. The lower plate 11 has a plurality of air holes 11c formed through the lower plate 11 at positions overlapping the positions of the hole portions 1B in the stacking direction when the rotor core 1A is placed, and serving as air vent holes during resin injection described later.

[Details of Magnet Disposing Step]

Figures 12A, 12B, 12C:
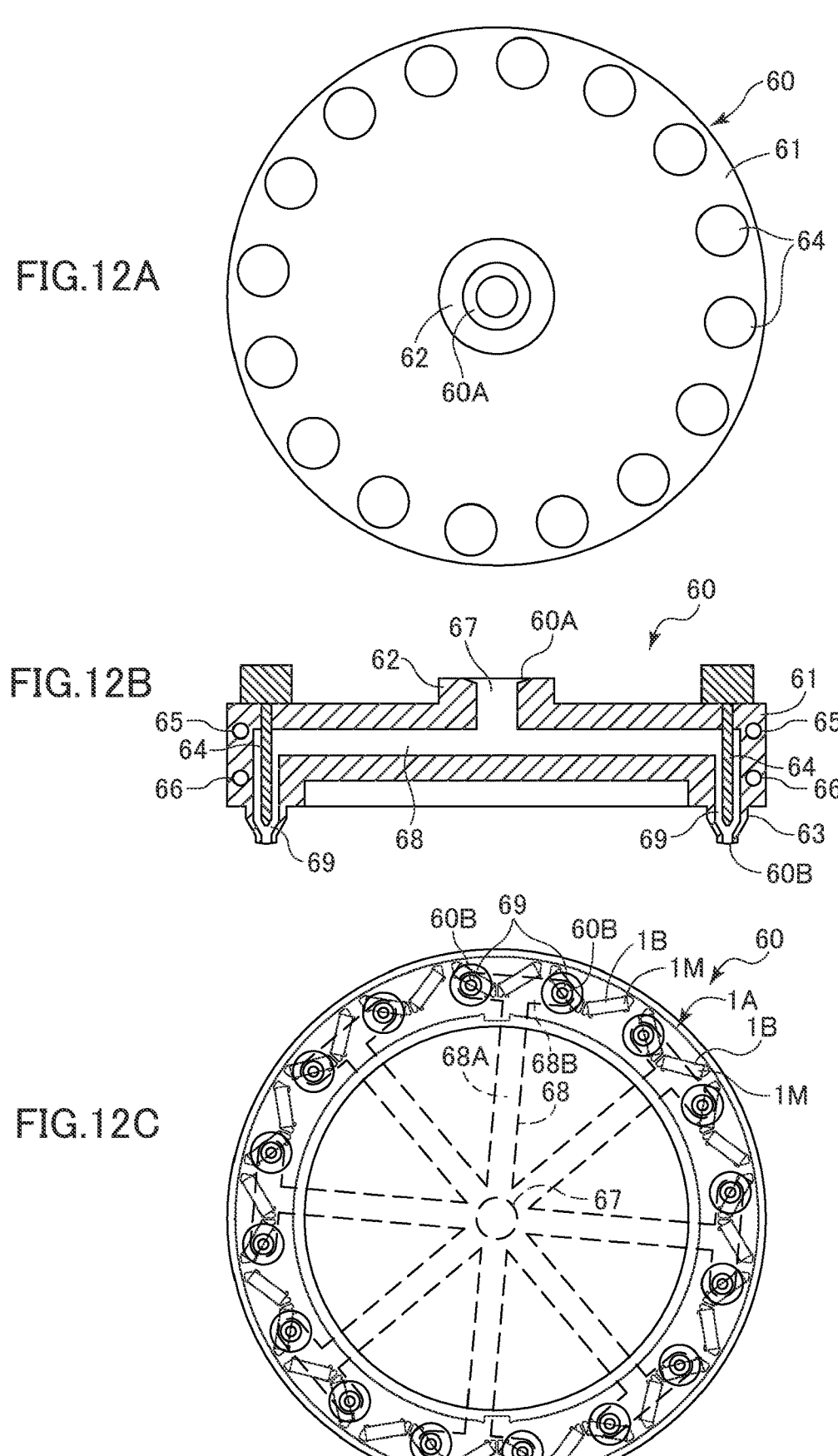
FIG. 12A is a top view showing the injection nozzle.
FIG. 12B is a sectional view showing the injection nozzle.
FIG. 12C is a top view showing a positional relationship between the rotor core and the injection nozzle.

Next, details of the magnet disposing step S2 will be described with reference to FIG. 3. As shown in FIG. 3, the rotor core 1A placed on the lower plate 11 of the holding jig 10 has the plurality of hole portions 1B formed by stacking the holes 1b of the stacked steel sheets 1a. The magnets 1M are inserted and disposed in the respective hole portions 1B. The rotor core 1A shown in FIG. 3 is described as a rotor core in which the magnets 1144 are disposed with their longitudinal directions corresponding to the circumferential direction. In the present embodiment, as shown in FIG. 12C, it is assumed that the longitudinal direction of the magnet 1M is inclined with respect to the circumferential direction and two magnets 1M are disposed so as to form a V shape when viewed from above. In general, the magnet is demagnetized when heated. Therefore, the magnet 1M at this stage is a magnet material before magnetization.

[Details of Jig Attaching Step]

Next, details of the jig attaching step S3 will be described with reference to FIG. 4. First, the structure of the holding jig 10 will be described.

Figure 4:
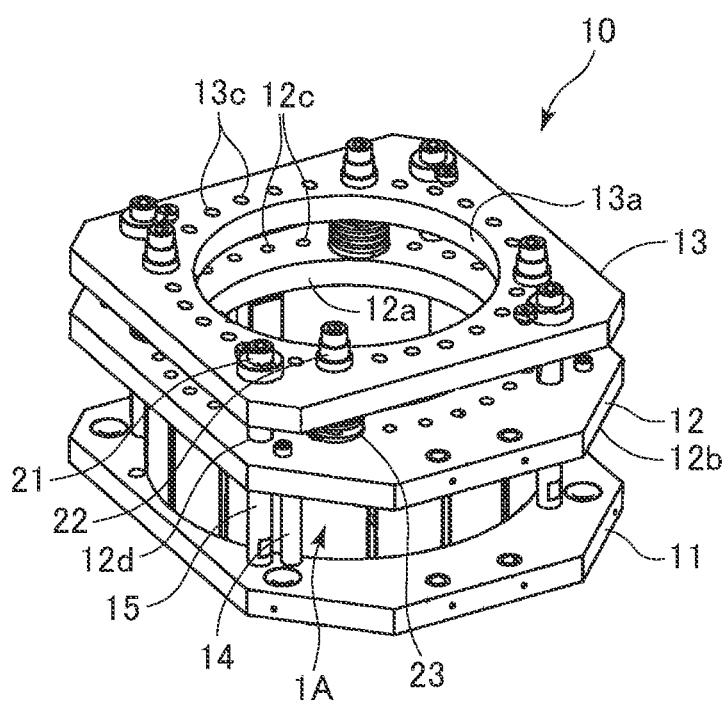
FIG. 4 is a perspective view showing a state in which the holding jig is attached to the rotor core.

As shown in FIG. 4, the holding jig 10 is broadly provided such that the lower plate 11 serving as a first plate, a pressing plate 12 serving as a second plate, and an upper plate 13 are sequentially disposed substantially in parallel in a vertical direction. The rotor core 1A is placed on the upper surface 11b of the lower plate 11 as described above, and the pressing plate 12 is placed above the rotor core 1A so that a lower surface 12b of the pressing plate 12 abuts against the rotor core 1A. The pressing plate 12 is a hollow plate-shaped member having a hole 11a formed at the center. As detailed later, a plurality of injection holes 12c serving as resin injection holes for injecting a resin is formed through the pressing plate 12 so as to be positioned above the hole portions 1B of the rotor core 1A. The pressing plate 12 has a plurality of through holes 12d through which the second shafts 15 described above can pass.

The upper plate 13 is a hollow plate-shaped member having a hole 13a formed at the center, and is fastened to the upper ends of the second shafts 15 with bolts 21. Coil springs 23 are compressed between the pressing plate 12 and the upper plate 13. A support shaft (not shown) is disposed on an inner side of each coil spring 23 and fixed to the upper plate 13 with a bolt 22, thereby positioning and supporting the coil spring 23. In the holding jig 10 structured as described above, the rotor core 1A is held under pressure between the lower plate 11 and the pressing plate 12 pressed by the coil springs 23 from the upper plate 13. As a result, the plurality of stacked steel sheets 1a of the rotor core 1A is pressed in the stacking direction and held in contact with each other with as small a gap as possible in the stacking direction. The upper ends of the first shafts 14 are formed so as to face the lower surface of the pressing plate 12. The pressing plate 12 abuts against the upper ends while being pressed downward by the coil springs 23 so as not to crush the rotor core 1A in the stacking direction.

When the holding jig 10 structured as described above is attached to the rotor core 1A in the jig attaching step S3, the rotor core 1A is placed (the stacked steel sheets 1a are disposed) on the upper surface 11b of the lower plate 11, the pressing plate 12 is placed above the rotor core 1A with the second shafts 15 passing through the through holes 15d, the upper plate 13 is placed with the coil springs 23 interposed between the upper plate 13 and the pressing plate 12, and the second shafts 15 and the upper plate 13 are fastened with the bolts 21. As a result, the holding jig 10 that holds the rotor core 1A while pressing it in the stacking direction is attached to the rotor core 1A so that the lower plate 11 and the pressing plate 12 are in surface contact with the stacked steel sheets 1a at both ends in the stacking direction (vertical direction) and the stacked steel sheets 1a including portions except the hole portions 1B and around the hole portions 1B are pressed.

[Details of Temperature Increasing Step]

Next, details of the temperature increasing step S4 will be described. In the first embodiment, the resin for fixing the magnets 1M in the hole portions 1B of the rotor core 1A is, for example, a thermosetting resin material that has a melting start temperature of 60° C., and a curing start temperature of 120° C., and is solid at room temperature. When the temperature of the rotor core 1A is lower than the melting start temperature, the resin may be solidified during the resin injection in the resin injection step S6 described later. Therefore, the hole portions 1B may be filled with the resin insufficiently. As detailed later, when the resin is injected into the hole portion 1B, the resin may leak from a small gap between the stacked steel sheets 1a. By setting the temperature of at least the hole portion 1B of the rotor core 1, to be equal to or higher than the curing start temperature when the resin is injected, curing is started from the resin in contact with the hole portion 1B, thereby preventing the resin from leaking between the stacked steel sheets 1a.

Figure 7:
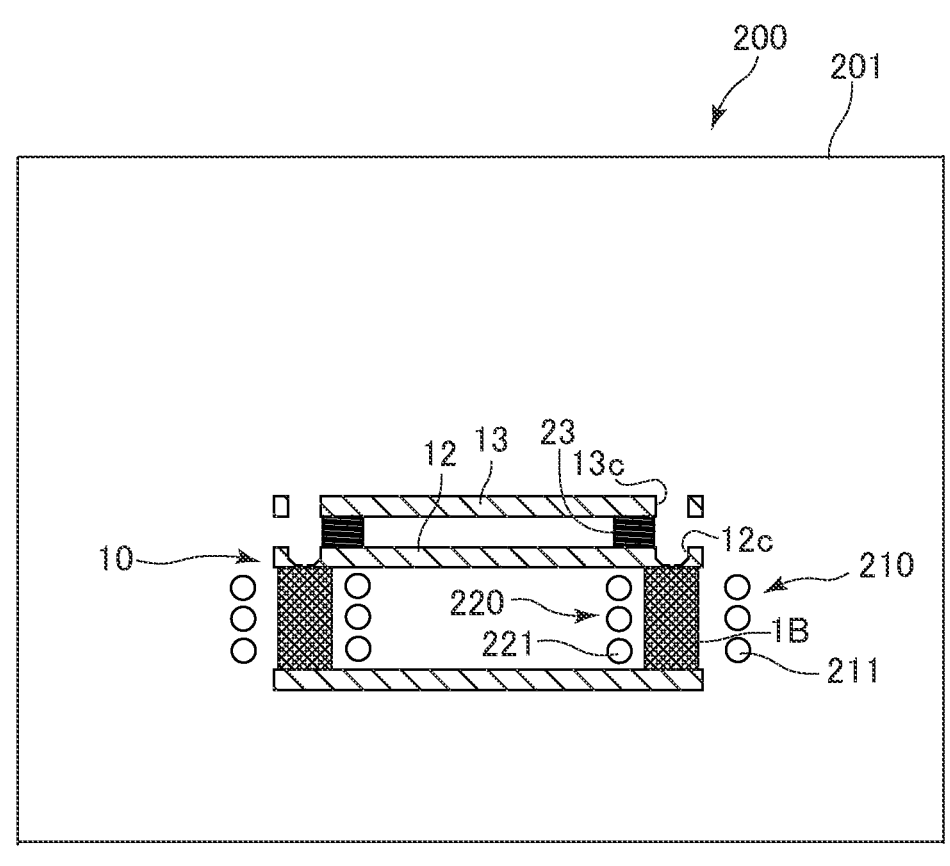
FIG. 7 is a sectional view showing a state in which the rotor core and the holding jig are heated in a heating device.

From the above background, in the temperature increasing step S4, as shown in FIG. 7, the rotor core 1A held by the holding jig 10 (to which the holding jig 10 is attached) is heated together with the holding jig 10 by a heating device 200 to increase the temperature. The heating device 200 is present as another device outside the resin injection apparatus 30, and has a heating chamber 201 where the rotor core 1A to which the holding jig 10 is attached is placed. The heating device 200 includes an induction heater 210 serving as a heat application unit for heating the rotor core 1A from a radially outer side of the rotor core 1A, and an induction heater 220 serving as a heat application unit for heating the rotor core 1A from a radially inner side of the rotor core 1A. A coil 211 for induction heating by the induction heater 210 is disposed so as to face and surround the outer peripheral surface of the rotor core 1A. A coil 221 for induction heating by the induction heater 220 is disposed so as to face and surround the inner peripheral surface of the rotor core 1A. In the temperature increasing step S4, such a heating device 200 heats at least the hole portion 113 of the rotor core 1A to increase the temperature to the curing start temperature of the resin or higher. In the first embodiment, the temperature of the hole portion 1B of the rotor core 1A is increased to, for example, about 150° C. in the temperature increasing step S4.

In the present embodiment, description is given of the device including the induction heater 210 for heating from the radially outer side of the rotor core 1A and the induction heater 220 for heating from the radially inner side of the rotor core 1A, but the device may include either one of the induction heaters alone. In the present embodiment, description is given of the method in which the rotor core 1A is heated by induction heating to increase the temperature, but the present disclosure is not limited to this method. The method may be a method using a so-called atmospheric path, in which the ambient temperature of a heating chamber is increased and the rotor core 1A placed in the heating chamber is heated to increase the temperature,

[Details of Injection Apparatus Placement Step]

Next, details of the injection apparatus placement step S5 for placing the rotor core 1A held by the holding jig 10 on the resin injection apparatus 30 for injecting the resin will be described with reference to FIGS. 5, 6, 8, 9, 11, 12A, 12B, and 12C. First, the structure of the resin injection apparatus 30 will be described.

Figure 6:
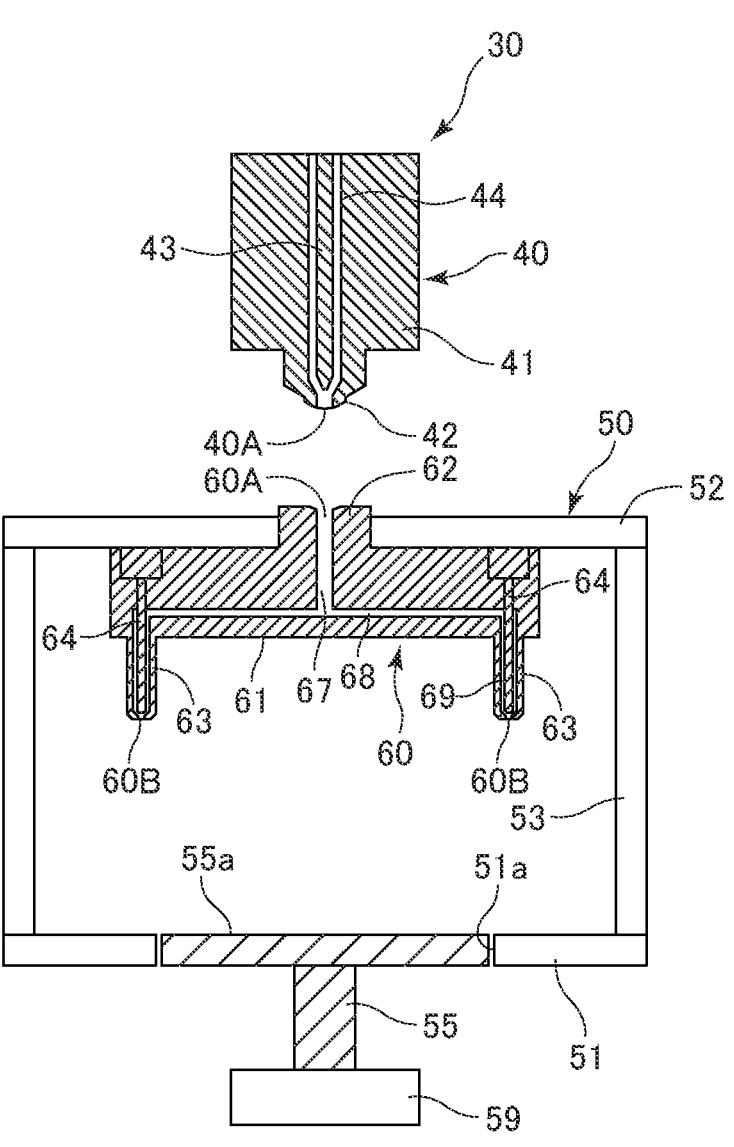
FIG. 6 is a sectional view showing a state in which an injection nozzle is attached to the rotor placement portion in the injection apparatus.
Figure 9:
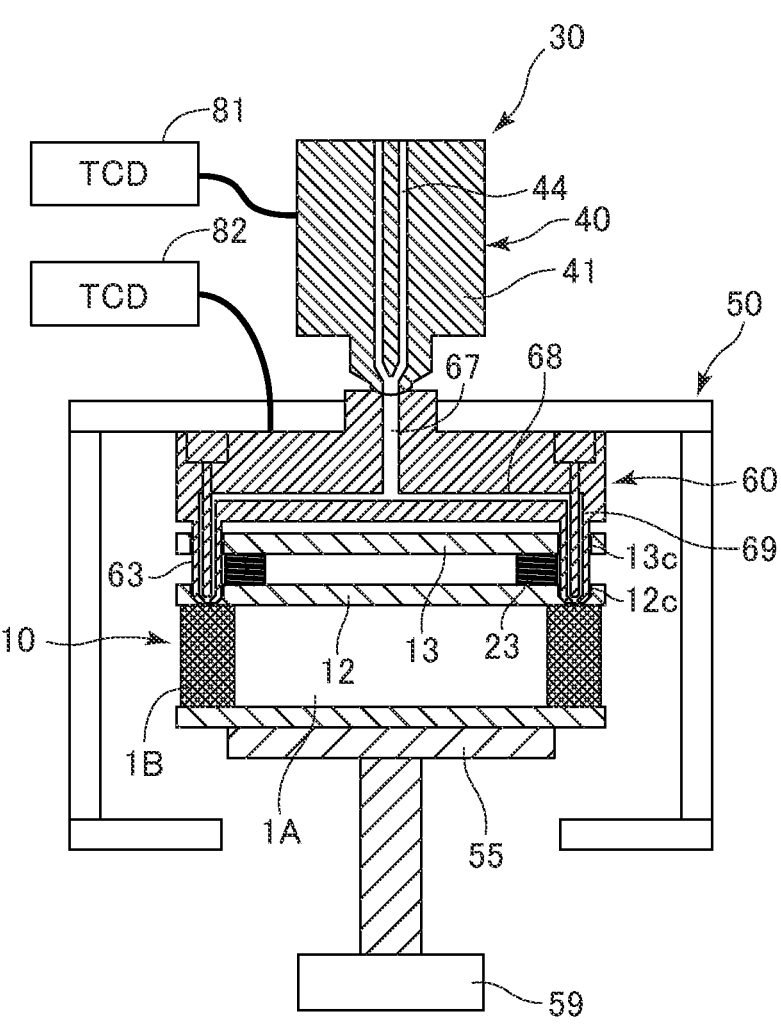
FIG. 9 is a sectional view showing a state in which the injection apparatus injects a resin into the rotor core.
Figure 11:
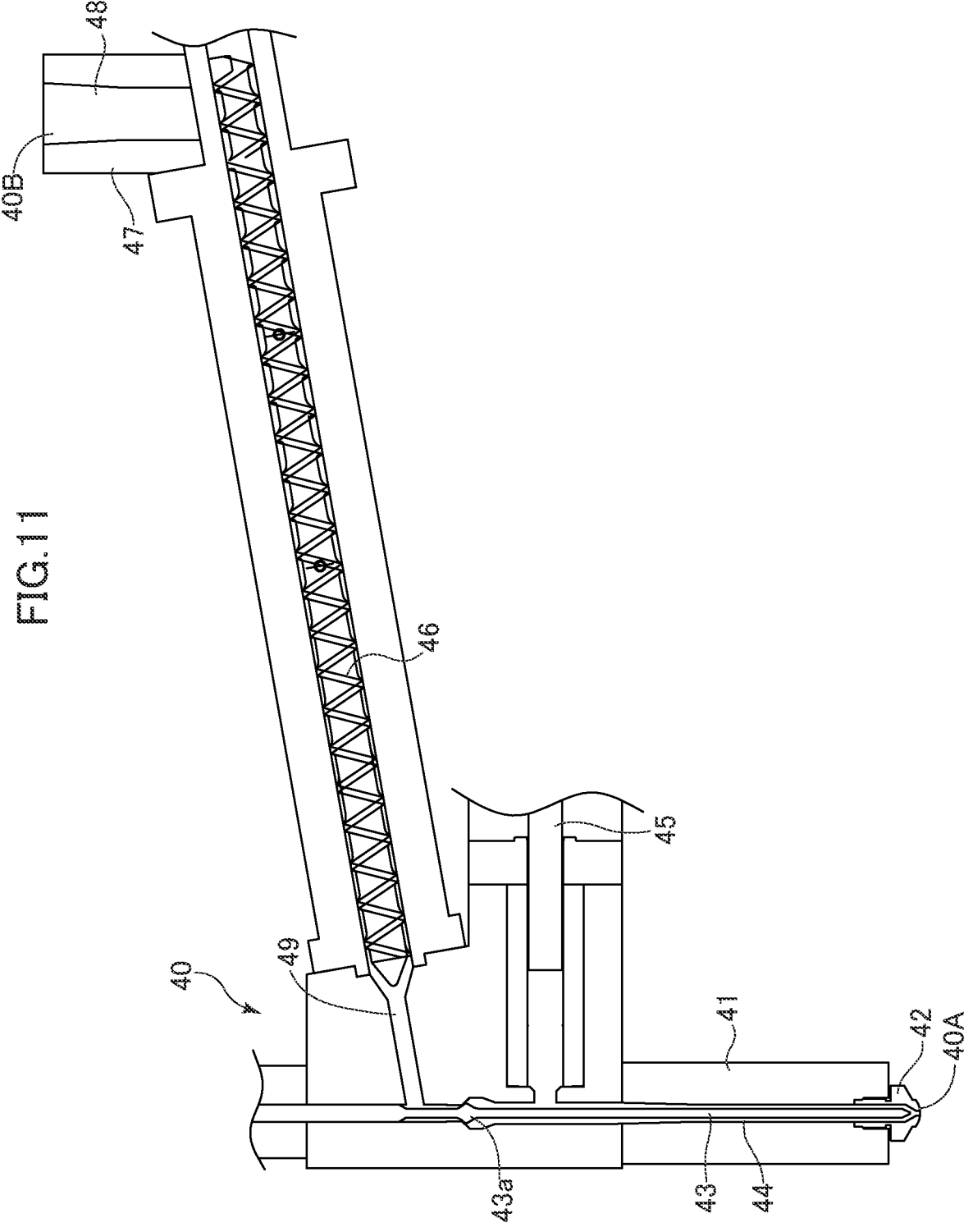
FIG. 11 is a sectional view showing the injector in the injection apparatus.

As shown in FIG. 6, the resin injection apparatus 30 includes, in a narrow sense, a resin injector 40 and a table portion 50. A runner 60 is disposed in the table portion 50 to structure, in a broad sense, the resin injection apparatus 30 for injecting the resin into the rotor core 1A. As shown in FIG. 11, the resin injector 40 includes a charging portion 47 having a resin charging hole 48 whose upper end serves as a resin material charging port 40B for charging a solid resin, a screw 46 for sending the resin charged from the resin material charging port 40B to a channel 49 while melting and agitating the resin, a tubular portion 41 having a channel 44 that communicates with the channel 49, a nozzle portion 42 fixed to the lower end of the tubular portion 41 and having an ejection port 40A at the lower end to eject the resin, a stop valve 43 that passes or blocks the resin flow from the channel 49 to the channel 44 by an on-off valve 43a, and a plunger 45 for ejecting the resin in the channel 44 from the ejection port 40A. As shown in FIG. 9, a temperature control device 81 (Temp Control Device) capable of heating or cooling by, for example, a heating wire serving as a heat application unit in the resin injection apparatus 30 or coolant supply is attached to the resin injector 40. The temperature control device 81 controls the temperature of the resin at, for example, about 80° C. equal to or higher than the melting start temperature and lower than the curing start temperature to keep the molten state of the resin between the resin material charging port 40B and the ejection port 40A. In particular, the temperature control device 81 heats the screw 46 to melt the resin that has been charged into the resin material charging port 40B and is solid at room temperature and keep the molten state of the resin.

As shown in FIG. 6, the table portion 50 includes a lower plate 51 disposed on a lower side, side walls 53 fixed to the side ends of the lower plate 51, and an upper plate 52 supported by the side walls 53 and disposed in parallel above the lower plate 51 to face the lower plate 51. A hole 51a is formed in the central portion of the lower plate 51. The table portion 50 includes a placement table 55 formed in conformity to the shape of the hole 51a and having an upper surface 55a serving as a table on which the lower plate 11 of the holding jig 10 is placed, and a driving device 59 for controlling the placement table 55 to ascend or descend and to rotate. Although illustration is omitted, the upper surface 55a of the placement table 55 has a projection, and the lower surface of the lower plate 11 of the holding jig 10 has a recess. By fitting the projection and the recess when the holding jig 10 is placed on the placemen table 55, the position of the holding jig 10 relative to the placement table 55 is regulated in the rotating direction, that is, the positions of the holding jig 10 and the rotor core 1A in the rotating direction are controlled by the rotation of the placement table 55.

Figure 5:
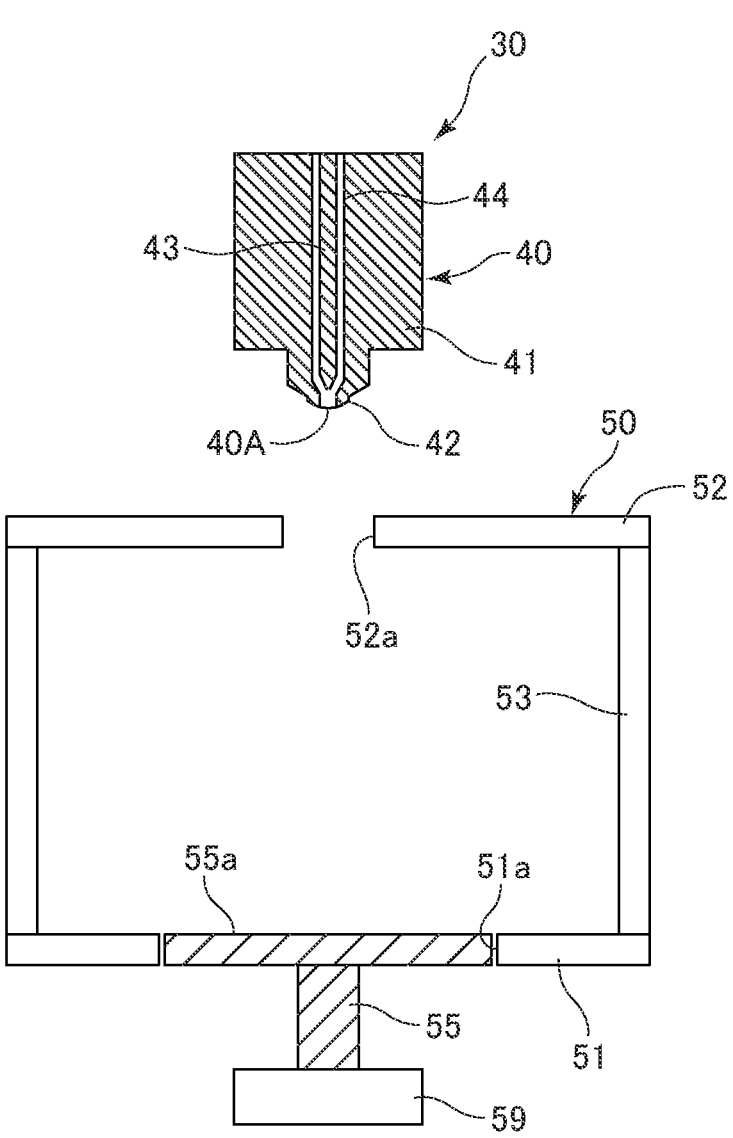
FIG. 5 is a sectional view showing a state in which an injector is separated from a rotor placement portion in an injection apparatus.

As shown in FIG. 5, an attachment hole 52a is formed in the upper plate 52 of the table portion 50. The runner 60 is detachably attached by fitting an upper shaft portion 62 of the runner 60 to the attachment hole 52a. As shown in FIGS. 12A and 12B, the runner 60 includes a disc-shaped body 61, the shaft-shaped upper shaft portion 62 extending upward from the center of the body 61, and a plurality of branch nozzles 63 extending downward from the lower outer periphery of the body 61. In the first embodiment, the number of the branch nozzles 63 is half the number of the hole portions 1B of the rotor core 1A. That is, when the number of the hole portions 1B (that is, the magnets 1M) of the rotor core 1A is 32, the number of the branch nozzles 63 is 16.

As shown in FIG. 1211, a charging channel 67 whose upper end serves as a resin charging port 60A is formed inside the runner 60 in the vertical direction along a central axis of the upper shaft portion 62 and the disc shape of the body 61. As shown in FIG. 12C, branch channels 68 that branch from the charging channel 67 toward the branch nozzles 63 are formed inside the body 61. The branch channels 68 include eight radiate channels 68A that radiately branch from the charging channel 67 in the horizontal direction orthogonal to the central axis, and circumferential channels 68B that each branch to both sides in the circumferential direction on the outer peripheral side of the radiate channel 68A. As shown in FIG. 12B, injection channels 69 are formed inside the body 61 and the branch nozzles 63 to extend downward from the circumferential ends of the circumferential channels 68B of the branch channels 68. The lower ends of the injection channels 69 are formed as ejection ports 60B. A stop valve 64 that opens or closes the ejection port 60B is provided inside each injection channel 69.

The runner 60 includes a heating wire 65 disposed so as to surround the runner 60 in the circumferential direction, and a coolant channel 66 similarly disposed so as to surround the runner 60 in the circumferential direction. The heating wire 65 and the coolant channel 66 are connected to a temperature control device 82 (Temp Control Device) shown in FIG. 9. Since the runner 60 is separated from the pressing plate 12 of the holding jig 10 and is influenced by the temperatures of the holding jig 10 and the rotor core 1A as thermal disturbance, the temperature control device 82 controls the temperature of the resin between the charging port 60A and the ejection ports 60B to keep the temperature at, for example, about 80° C. equal to or higher than the melting start temperature and lower than the curing start temperature by supplying a current to the heating wire 65 for heating or by supplying a coolant to the coolant channel 66 for cooling. Since the temperature control device 82 is connected to the runner 60, it is difficult to move in the vertical direction or the rotating direction. As described later, the placement table 55 is driven by the driving device 59 to ascend or descend or to rotate. Therefore, the runner 60 is not moved in the resin injection step S6.

Figure 8:
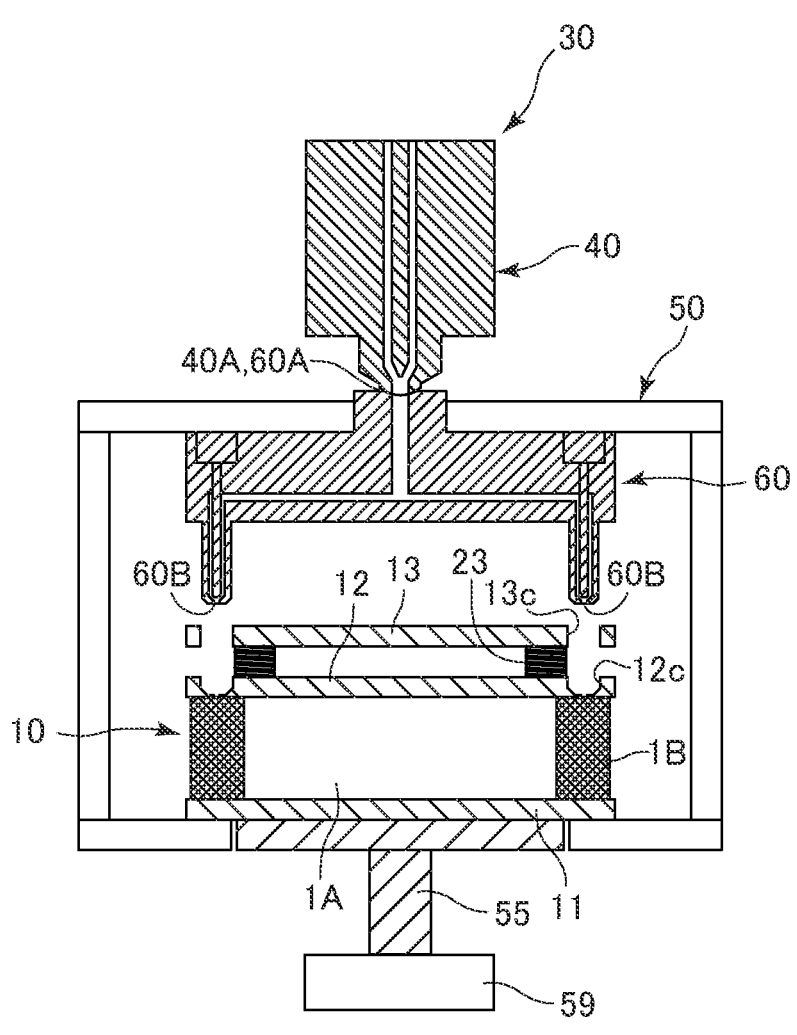
FIG. 8 is a sectional view showing a state in which the rotor core is placed on the rotor placement portion in the injection apparatus.

In the injection apparatus placement step S5 for placing the rotor core 1A to which the holding jig 10 is attached on the resin injection apparatus 30 structured as described above, the resin injector 40 is first separated from the table portion 50 as shown in FIG. 5, and the runner 60 is attached to the upper plate 52 by fitting the upper shaft portion 62 to the attachment hole 52a of the upper plate 52 as shown in FIG. 6 in a state in which the placement table 55 descends with the upper surface 55a flush with the lower plate 51. In this state, the rotor core 1A to which the holding jig 10 is attached is placed on the placement table 55 as shown in FIG. 8. At this time, the rotor core 1A is fixed so as to be immovable in the rotating direction by fitting the projection (not shown) provided to the upper surface 55a of the placement table 55 to the recess (not shown) provided to the lower plate 11 of the holding jig 10 as described above. As shown in FIG. 9, the placement table is caused to ascend by the driving device 59, the branch nozzles 63 are inserted into the through holes 13c of the upper plate 13 and the injection holes 12c of the pressing plate 12 that are formed in the holding jig 10, and the tips of the branch nozzles 63 are set in pressure contact with the injection holes 12c. Thus, the rotor core 1A is placed on the resin injection apparatus 30.

[Details of Resin Injection Step]

Next, details of the resin injection step S6 will be described with reference to FIGS. 9, 13A, 13B, 13C, and 15. First, description will be given of a positional relationship between the injection hole 12c of the pressing plate 12 of the holding jig 10 and the hole portion 1B of the rotor core 1A and the shape of the injection hole 12c. FIG. 13B shows a cross section viewed along arrows A-A in FIG. 13A. FIG. 13C shows a state in which the holding jig 10 is detached from the rotor core 1A at the same position as that in FIG. 13B.

Figure 13A:
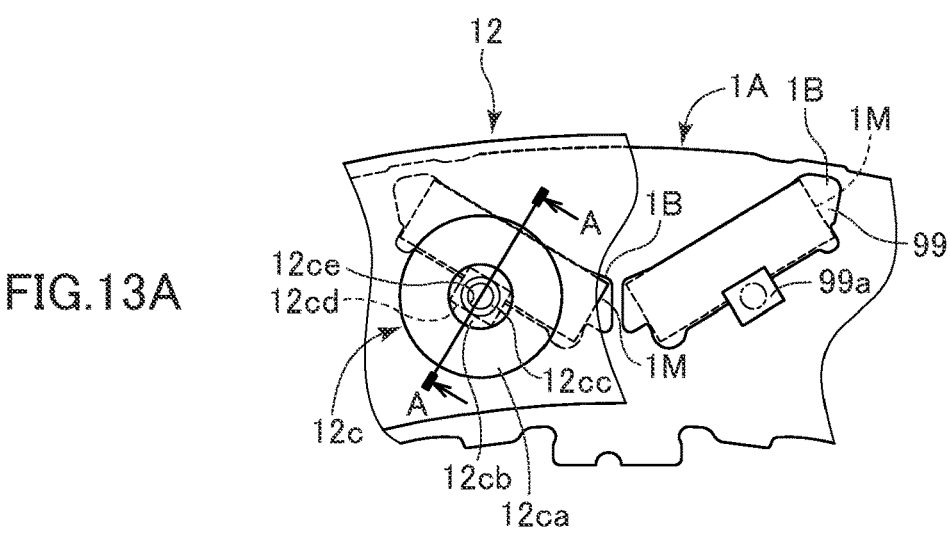
FIG. 13A is an enlarged top view showing a positional relationship between a hole portion of the rotor core and each of a nozzle and a gate of the injection nozzle, and a state of the injected resin.
Figure 13B:
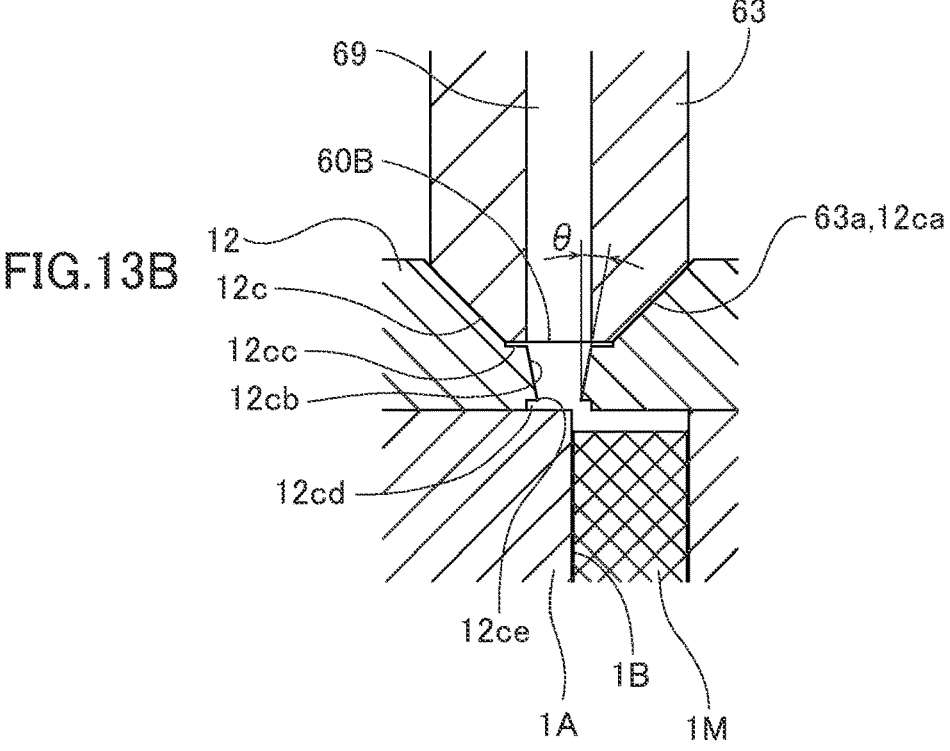
FIG. 13B is an enlarged sectional view showing the hole portion of the rotor core and the nozzle and the gate of the injection nozzle.
Figure 13C:
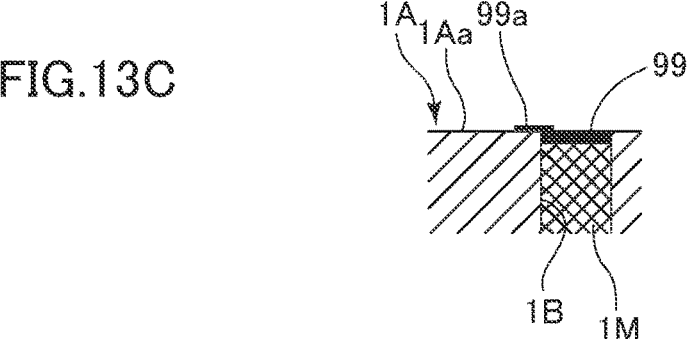
FIG. 13C is an enlarged sectional view showing the rotor core and the state of the resin after resin injection.

In the state in which the holding jig 10 is attached to the rotor core 1A, the injection hole 12c of the pressing plate 12 is positioned to at least partially overlap the hole portion 1B of the rotor core 1A as shown in FIG. 13A. Specifically, the center of the injection hole 12c is positioned on a radially inner side of the rotor core 1A with respect to the hole portion 1B. When the resin is injected into the hole portion 1B, the magnet 1M is pressed to an outer peripheral side by the pressure of the resin. As a result, the magnet 1M is brought closer to a radially outer side of the rotor core 1A. That is, when the rotor core 1A is attached to the stator as the rotary electric machine, the magnet III is brought as close to the stator as possible, thereby increasing the magnetic force and improving the output and efficiency of the rotary electric machine.

As shown in FIG. 13B, the injection hole 12c of the pressing plate 12 of the holding jig 10 includes a first inclined surface 12ca that has an inclined shape gradually decreasing in bore diameter so that a conical inclined surface 63a at the tip of the branch nozzle 63 can be fitted in pressure contact, and that is sealed when fitted, a second inclined surface 126 that is disposed below the first inclined surface 12ca (close to the rotor core 1A) and has a tapered shape with decreasing bore diameter toward the rotor core 1A in a penetrating direction of the injection hole 12c by being inclined at an acute angle θ with respect to the center of the injection hole 12c, a step portion 12ca that is formed between the first inclined surface 12ca and the second inclined surface 12cb and prevents the branch nozzle 63 from entering the second inclined surface 12cb, a small-diameter portion 12ce that is formed at the lower tip of the second inclined surface 12*cb* and functions as a throttle portion with the smallest bore diameter, and an enlarged opening portion 12*cd* that is wider than the small-diameter portion 12*ce* in the horizontal direction (direction orthogonal to the penetrating direction) below the small-diameter portion 12*ce* and serves as an opening portion of the injection hole 12*c*.

In the first embodiment, the angle θ of the second inclined surface 12*cb* is set to, for example, 30°, but may be any acute angle, that is, may be larger than 0° and smaller than 45°. In the first embodiment, as shown in FIG. 13A, the enlarged opening portion 12*cd* has a rectangular shape that extends in the horizontal direction at a position including the small-diameter portion 12*ce* when viewed in the vertical direction, but is not limited to this shape, and may have any shape such as a circular shape, an elliptical shape, or an oblong shape in sectional view as long as the sectional area in the horizontal direction is larger than that of the small-diameter portion 12*ce*. The enlarged opening portion 12*cd* is positioned across an upper surface 1Aa and the hole portion 1B of the rotor core 1A in a state in which the pressing plate 12 abuts against the upper surface 1Aa of the rotor core 1A. The small-diameter portion 12*ce* has a diameter of, for example, about 1 mm to 5 mm, and the enlarged opening portion 12*cd* has a vertical thickness of, for example, about 0.5 mm.

In the resin injection step S6 for injecting the resin into the hole portion 1B of the rotor core 1A from the injection hole 12*c* of the pressing plate 12 of the holding jig 10 structured as described above, as shown in FIG. 9, in the resin injector 40 of the resin injection apparatus 30, the stop valve 43 is opened and the resin in the channel 44 is pressed by the plunger 45 (see FIG. 11). Therefore, the resin is ejected from the ejection port 40A into the charging port 60A of the runner 60. The resin flows from the charging channel 67 of the runner 60 to branch into the eight radiate channels 68A, and further flows from the radiate channels 68A to the ejection ports 60B of the 16 branch nozzles 63 through the circumferential channels 68B. When the stop valves 64 are opened, the resin is ejected from the 16 ejection ports 60B into the injection holes 12*c*, and is injected from the injection holes 12*c* into the 16 hole portions 1B of the rotor core 1A. In each hole portion 1B, the resin fills the periphery of the magnet 1M while pressing the magnet 1M toward the radially outer side of the rotor core 1A.

At this time, air inside the hole portion 1B escapes from the air hole 1 is of the lower plate 11 of the holding jig 10, and the resin fills the hole portion 1B without a gap. Since the rotor core 1A (in particular, the inner peripheral surface of the hole portion 1B) is heated to a temperature higher than the curing start temperature of the resin as described above, as shown in FIG. 15, a resin 99 filling the hole portion 1B remains liquid at an inner portion 99B, but starts to be cured from a portion 99A in contact with the side surface of the hole portion 1B, thereby preventing the resin from leaking from the gap between the stacked steel sheets 1*a* in the hole portion 1B. As shown in FIG. 13C, the filling resin 99 fills the hole portion 1B up to its opening, and further fills the enlarged opening portion 12*cd* while causing air to slightly escape into the enlarged opening portion 12*cd*. A rectangular plate-shaped resin plate portion 99*a* is formed across the hole portion 1B and the upper surface 1Aa of the rotor core 1A. The function of the plate portion 99*a* will be described later in detail in the jig detaching step S8.

When the eight hole portions 1B of the rotor core 1A have been filled with the resin, the rotor core 1A to which the holding jig 10 is attached is separated from the branch nozzles 63 by causing the placement table 55 to descend by the driving device 59 as shown in FIG. 8. Then, the placement table 55 is rotated by the driving device 59, and the phase is adjusted so that the branch nozzles 63 are positioned above the hole portions 1B that are not filled with the resin. The placement table 55 is caused to ascend to insert and set the branch nozzles 63 in the injection holes 12*c* where the resin is not injected. Then, the resin is injected similarly to the above to fill the remaining 16 hole portions 1B out of the 32 hole portions 1B. In the manner described above, the resin injection step S6 is finished.

[Details of Magnet Fixing Step]

Figure 10:
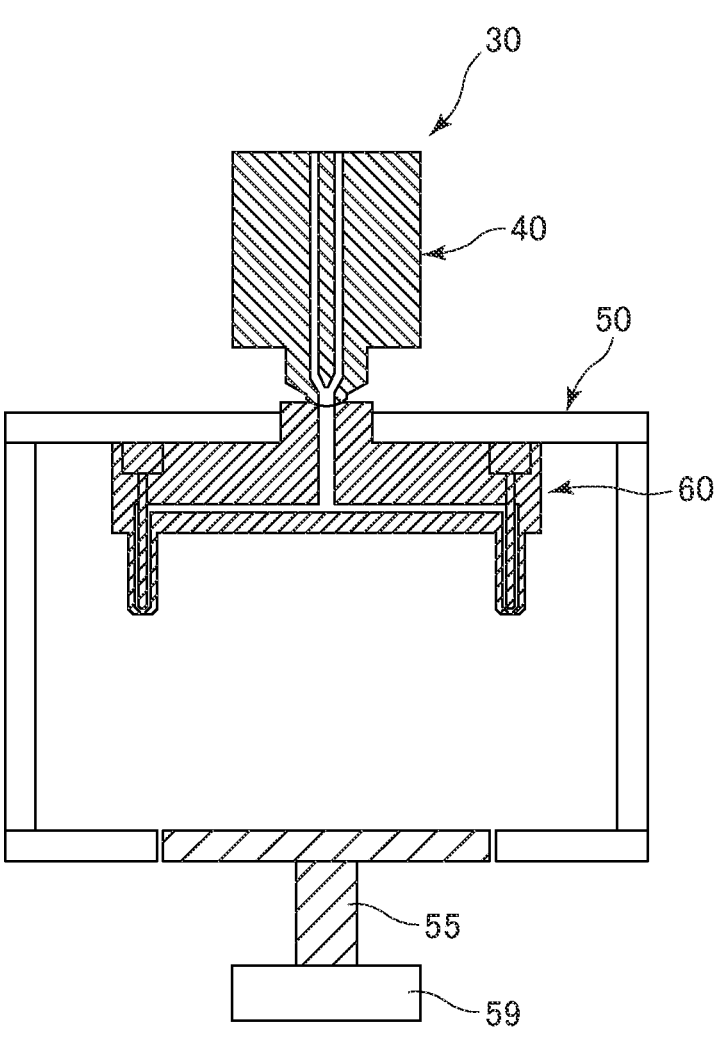
FIG. 10 is a sectional view showing a state in which the rotor core into which the injection apparatus has injected the resin is detached from the rotor placement portion.

Next, details of the magnet fixing step S7 will be described. When the resin injection step S6 is finished, as shown in FIG. 10, the rotor core 1A to which the holding jig 10 is attached is detached from the placement table 55 of the resin injection apparatus 30. That is, the rotor core 1A is taken out from the resin injection apparatus 30. In this state, the temperature of the rotor core 1A is increased to, for example, about 170° C. equal to or higher than the curing start temperature of the resin by the same heating device 200 as that used in the temperature increasing step S4 with the holding jig 10 attached. That is, the resin filling the hole portion 1B of the rotor core 1A starts to be cured from the portion in contact with the rotor core 1A during the injection as described above, but there is a portion that is not completely cured inside the hole portion 1B. Therefore, in the magnet fixing step S7, the temperature is further increased to completely cure the resin in the hole portion 1B within a predetermined period (for example, 1 minute) after the resin has been injected in the resin injection step S6. In the present embodiment, a fixing temperature T5 equal to or higher than a curing start temperature T3 is kept until the predetermined period elapses so that the resin in the hole portion 1B is completely cured. As a result, the magnet 1M is completely fixed to the hole portion 1B of the rotor core 1A by the resin. In the first embodiment, description is given of the case where the rotor core 1A is heated by the heating device 200 in the magnet fixing step S7 so that the temperature becomes, for example, about 170° C. Since the rotor core 1A has already been heated to, for example, about 150° C. equal to or higher than the curing start temperature of the resin in the temperature increasing step S4, the temperature may be kept at the curing start temperature or higher until the resin is cured and the magnet is fixed. When the rotor core 1A is further heated as in the first embodiment, the period required until the resin is securely cured is shorter even in consideration of the subsequent cooling period.

When the resin curing is completed in the magnet fixing step S7 as described above, the rotor core 1A is completed as the rotor 1. Then, a rotor shaft and the like are attached to the rotor 1 to form a rotor with a shaft, which constitutes a broadly defined rotor as a component of the rotary electric machine.

In the first embodiment, the temperature increasing step S4 and the magnet fixing step S7 are separately described. As described above, the heating of the rotor core 1A is started in the temperature increasing step S4, and the temperature of the rotor core 1A is kept at the curing start temperature of the resin or higher until the magnet fixing step S7. Therefore, the temperature increasing step in a broad sense continues up to the temperature increasing step S4, the injection apparatus placement step S5, the resin injection step S6, and the magnet fixing step S7. In other words, the temperature increasing step S4 is also the step of fixing the magnets 1M to the rotor core 1A because the heating is performed to cure the resin even before the resin is injected. The temperature increasing in a broad sense is to increase the temperatures of the rotor core 1A and the resin relative to a normal environmental temperature, and is not necessarily limited to continuous temperature increasing.

[Details of Jig Detaching Step]

Next, details of the jig detaching step S8 will be described. When the magnets 1M are completely fixed to the hole portions 1B of the rotor core 1A by curing the resin in the magnet fixing step S7, the holding jig 10 is detached from the rotor core 1A (rotor 1). That is, the holding jig 10 is detached from the rotor core 1A in the order opposite to the order of attachment of the holding jig 10 to the rotor core 1A in the jig attaching step S3. Specifically, the bolts 21 shown in FIG. 4 are unfastened to detach the upper plate 13 and the coil springs 23. Then, the pressing plate 12 is detached from the lower plate 11 by being pulled out from the second shafts 15 to achieve the state shown in FIG. 3. Lastly, the rotor core 1A is taken out from the lower plate 11 upward. Thus, the jig detaching step S8 is finished.

Figure 14:
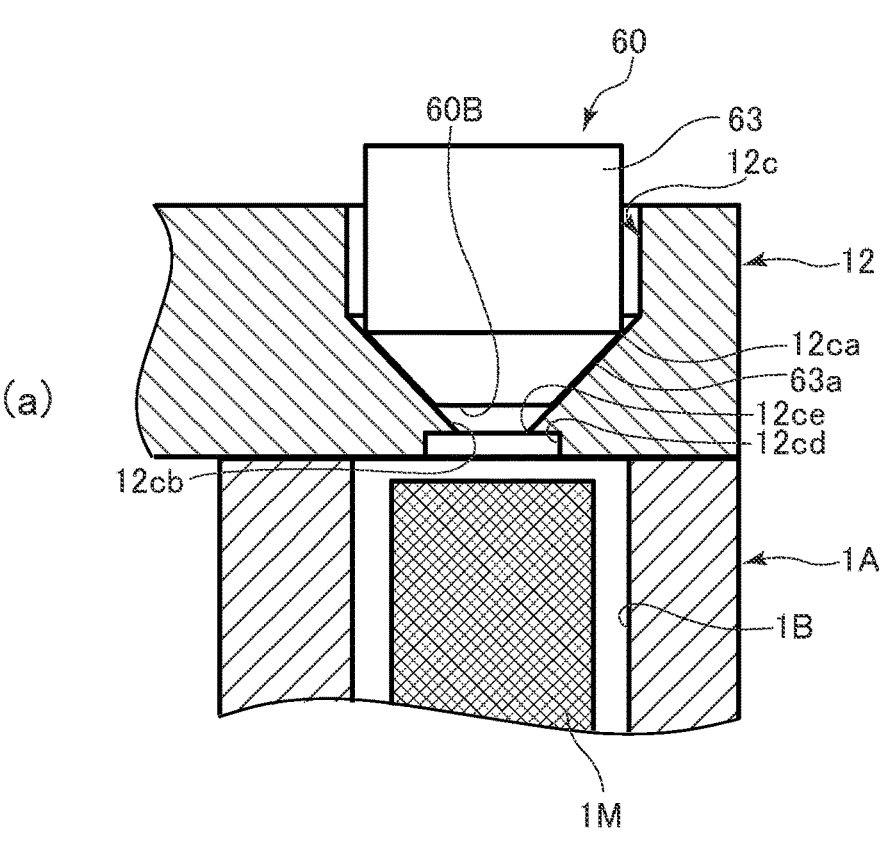
FIG. 14A is a schematic sectional view illustrating the shapes of and the positional relationship between the hole portion of the rotor core and each of the nozzle and the gate of the injection nozzle.
FIG. 14B is a schematic sectional view illustrating separation of the resin at the gate after the resin injection.
Figure 14:
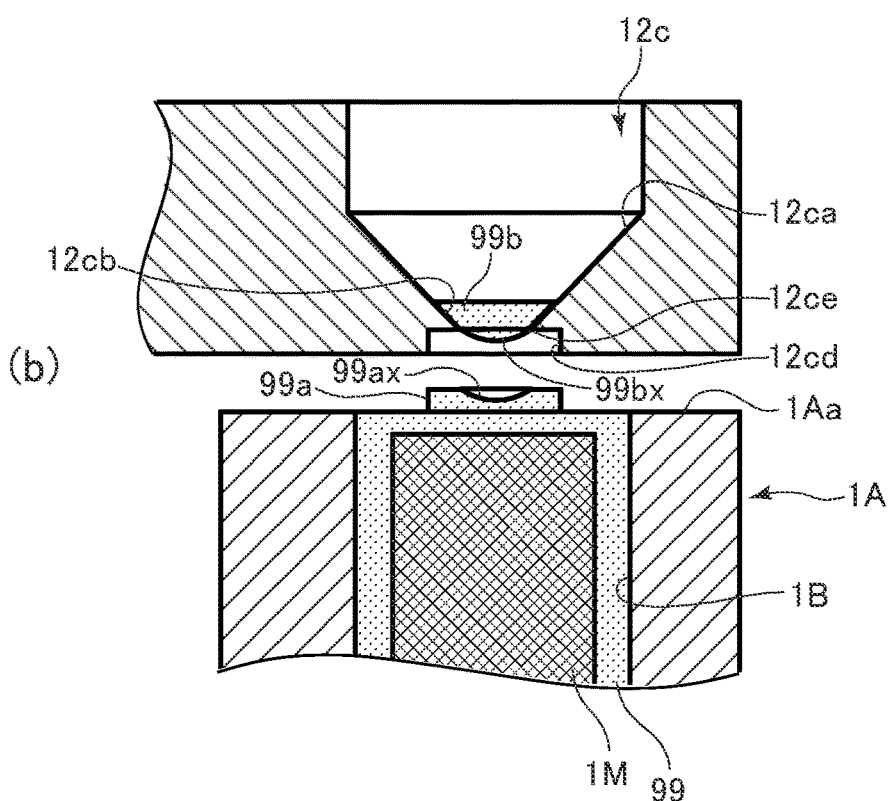
Figure 15:
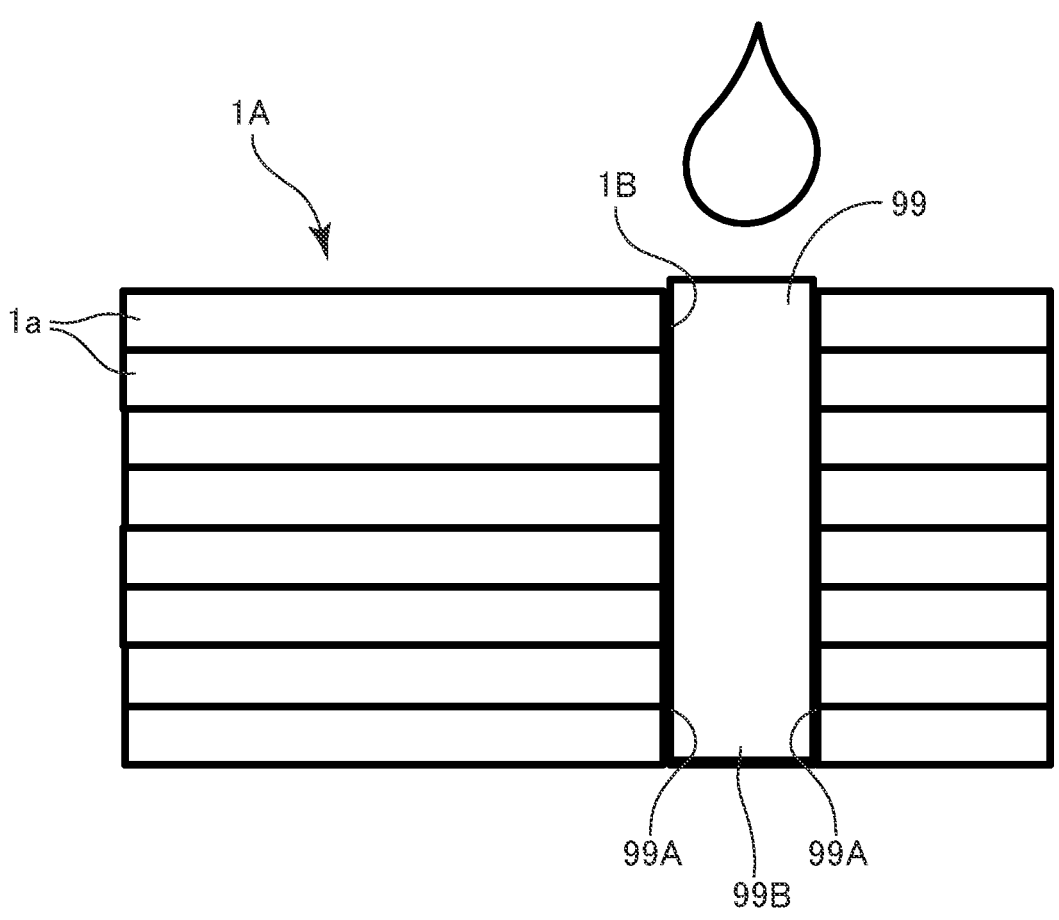
FIG. 15 is an explanatory diagram illustrating the state of the resin injected into the hole portion of the rotor core.

Separation of the resin at the injection hole 12c of the pressing plate 12 of the holding jig 10 will be described with reference to FIGS. 14A and 14B. FIGS. 14A and 14B are schematic diagrams for facilitating the description. The detailed shape of the injection hole 12c is more exactly shown in NG. 13B.

In general, when a nozzle is moved away after a resin is ejected from the nozzle, the uncured resin may extend like a thread to form a so-called burr. In order that the burr does not come into contact with the surrounding components inside the rotary electric machine or does not fall into the rotary electric machine, it is necessary to perform a debarring process for cleanly removing the burr. However, such a deburring process requires dedicated equipment. Further, it is difficult to automate the deburring process. Therefore, it is necessary to assign an operator. Thus, the cost may increase. In view of this, the first embodiment has a feature in the shape of the injection hole 12c so that the deburring process becomes unnecessary.

In the resin injection step S6 described above, the resin is injected into the hole portion 1B of the rotor core 1A in a state in which the branch nozzle 63 of the runner is inserted in pressure contact with the injection hole 12c of the pressing plate 12 as shown in FIG. 14A. At this time, the branch nozzle 63 does not enter the second inclined surface 12cb due to the step portion 12ce. Therefore, the ejection port 60B is positioned on the second inclined surface 12cb side in the penetrating direction with respect to the small-diameter portion 12ce of the injection hole 12c. The resin 99 particularly fills portions located below the ejection port 60B of the branch nozzle 63 and surrounded by the second inclined surface 12cb and by the enlarged opening portion 12cd to form, as shown in FIG. 14B, the plate portion 99a (see FIG. 13C) by the enlarged opening portion 12cd and a conical portion 99b having a conical shape by the second inclined surface 12cb so as to be connected to the plate portion 99a. At this time, a narrow constriction is formed in the horizontal direction between the resin plate portion 99a and the conical portion 99b due to the small-diameter portion 12ce. Although the ejection port 60B is located at the end of the first inclined surface 12ca in the first embodiment, it may enter the second inclined surface 12cb halfway.

If the pressing plate 12 is separated from the rotor core 1A when the pressing plate 12 is detached from the upper surface 1Aa of the rotor core 1A in the jig detaching step S8, the second inclined surface 12cb pulls the conical portion 99b upward while grabbing it. Thus, it is possible to break the conical portion 99b by concentrating a shear stress on the constricted part having low rigidity. When the pressing plate 12 is pulled upward, the conical portion 99b pulls the plate portion 99a. As shown in MG. 13A, the plate portion 99a is formed across the hole portion 1B and the upper surface 1Aa, of the rotor core 1A so as to adhere to the rotor core 1A in an area equal to or larger than the sectional area of the small-diameter portion 12ce. Therefore, the majority of the tensile stress is received by the upper surface 1Aa of the rotor core 1A. Thus, it is possible to prevent influence on the positional accuracy of the magnet 1M by pulling the magnet 1M via the resin 99 in the hole portion 1B. Regarding a broken portion 99bx of the conical portion 99b and a broken portion 99ax of the plate portion 99a shown in FIG. 14B, the broken portion 99ax is a recess and the broken portion 99bx is a projection. Depending on the temperature or the degree of tensile strength, the broken portion 99ax and the broken portion 99bx may be substantially smooth or the projection and recess may be reversed. When the branch nozzle 63 is separated from the injection hole 12c, the resin may extend like a thread from the ejection port 60B to form a burr. The burr is formed at an upper part of the conical portion 99b and the conical portion 99b is finally discarded. Therefore, even if the burr is formed at that part, the burr does not remain on the rotor core 1A.

As described above, when the pressing plate 12 of the holding jig 10 is detached from the rotor core 1A in the jig detaching step S8, the conical portion 99b can cleanly be broken off the resin plate portion 99a. For example, the step for the deburring process can be made unnecessary. Since the holding jig 10 is detached before the cooling in the cooling step S9 described later, the separation between the lower plate 11 and the resin in the hole portion 1B of the rotor core 1A and between the pressing plate 12 and each of the resin plate portion 99a and the hole portion 1B can be performed in a high-temperature and uncooled Mate of the resin. That is, the separation can be performed before the adhesion is strengthened by the cooling of the resin. Therefore, the holding jig can be detached easily. The conical portion 99b remaining in the injection hole 12c of the pressing plate 12 is removed and discarded by pushing it out with a pin or the like. Then, the components of the holding jig 10 including the air holes 11c of the lower plate 11 are cleaned with a brush or the like, and are used again for manufacturing the next rotor core 1A.

[Details of Cooling Step]

Lastly, details of the cooling step S9 will be described. After the holding jig 10 is detached from the rotor core 1A (rotor 1) in the jig detaching step S8 as described above, the rotor core 1A from which the holding jig 10 is detached and the holding jig 10 detached from the rotor core 1A are put into a cooling device together and individually cooled inside the cooling device. That is, when the holding jig 10 is attached to the rotor core 1A, the lower plate 11 and the pressing plate 12 are particularly in contact with and cover both the upper and lower surfaces of the rotor core 1A. By detaching the holding jig 10, the exposed surface area of the rotor core 1A is larger than that before the detachment. Thus, the cooling efficiency increases. Since the holding jig 10 also has a large heat capacity, the holding jig 10 and the rotor core 1A are not easily cooled due to the large heat capacity in the state in which the holding jig 10 is attached to the rotor core 1A. By separating the holding jig 10 and the rotor core 1A, the cooling efficiency increases because each heat capacity decreases. As a result, it is possible to shorten the cooling period of the rotor core 1A and to shorten the cooling period of the holding jig 10 as well.

[Transition of Temperature of Rotor Core and Temperature of Resin in Each Step]

Figure 16:
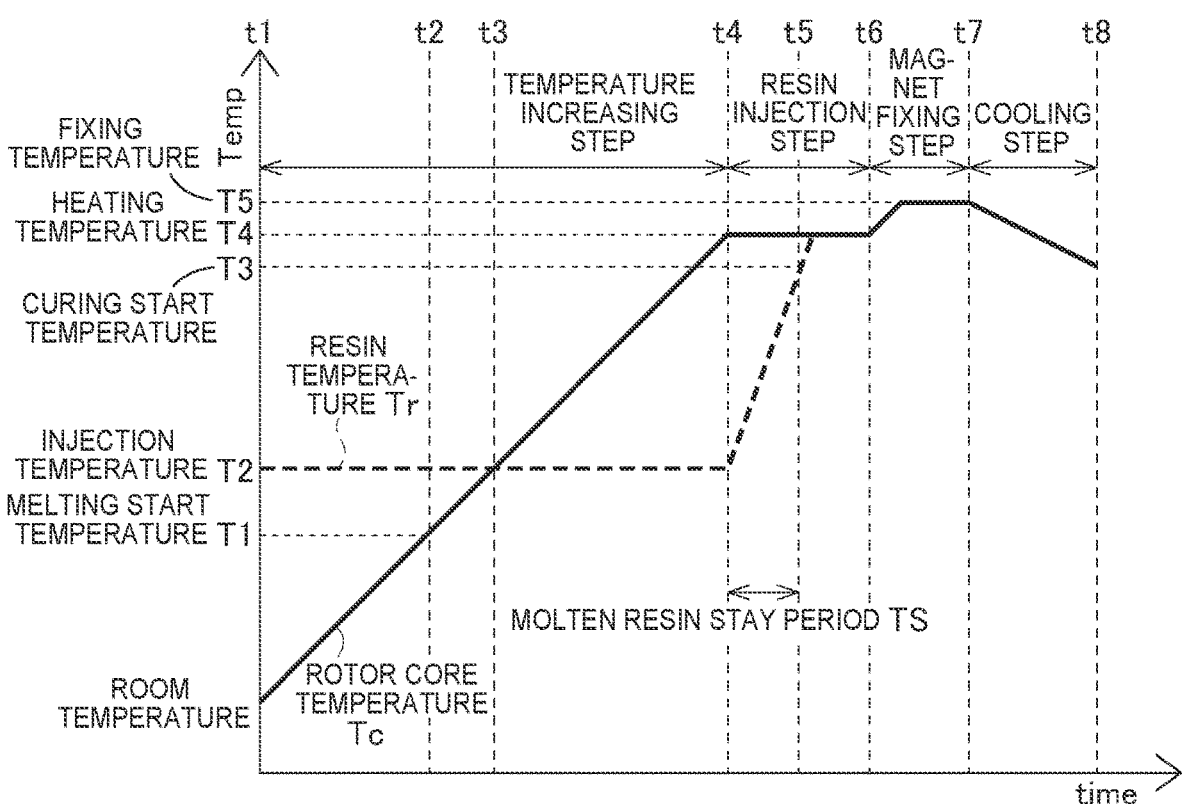
FIG. 16 is a time chart showing transition of the temperature of the rotor core and the temperature of the resin in each step according to the first embodiment.
Figure 17:
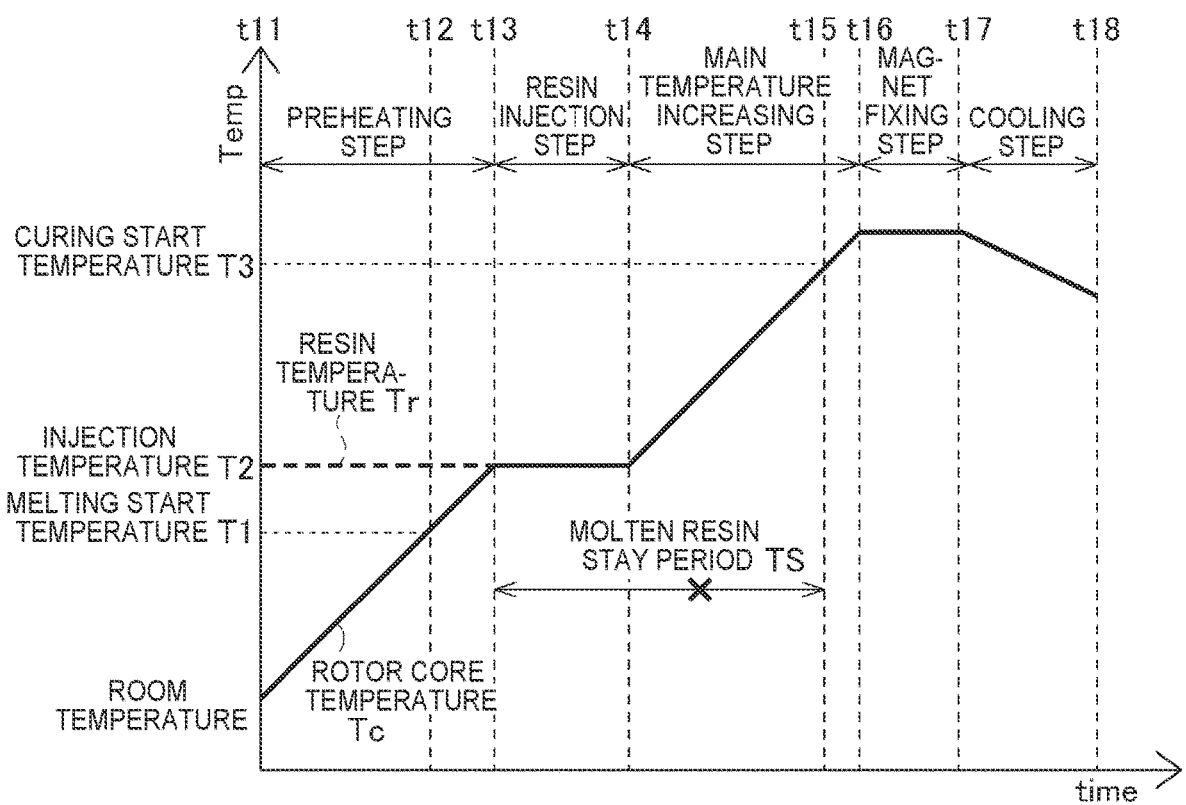
FIG. 17 is a time chart showing transition of the temperature of the rotor core and the temperature of the resin in each step according to related att.

Next, transition of the temperature of the rotor core and the temperature of the resin in each step described above will be described with reference to FIGS. 16 and 17. First, a method for heating a rotor core in related art will be described with reference to FIG. 17. As shown in FIG. 17, when a preheating step for preheating the rotor core 1A is started at a time t11, the temperature of the rotor core 1A (hereinafter referred to as "rotor core temperature") Tc is a room temperature, and the temperature of the resin being heated and melted in the resin injector 40 (hereinafter referred to as "resin temperature") Tr is a temperature (for example, 807° C.) higher than a melting start temperature T1 (for example, 60° C.). The room temperature is a temperature of an environment where the resin injection apparatus 30 is disposed in a factory or the like, and is assumed to be, for example, about 15° C. to 30° C. The resin temperature Tr at which the resin is melted by the resin injector is hereinafter referred to as "injection temperature T2" because it is a temperature at which the resin is injected into the hole portion 1B of the rotor core 1A.

In this preheating step, the rotor core temperature Tc exceeds the melting start temperature T1 at a time t12, and the heating is performed to the injection temperature T2 by a time t13. At the time t13, the rotor core 1A is placed on the resin injection apparatus 30, and the process proceeds to the resin injection step to inject the resin from the resin injector 40 into the hole portions 1B of the rotor core 1A. When the resin injection step is finished at a time t14, the rotor core 1A is detached from the resin injection apparatus 30, and the process proceeds to a main temperature increasing step. The rotor core 1A into which the resin is injected is reheated by a heating device (not shown) to increase the temperature to a target temperature of, for example, 150° C. at a time t16 while exceeding, at a time t15, the curing start temperature 13 (for example, 120° C.) at which the resin is cured. At the time t16, the process proceeds to the magnet fixing step to wait until the resin injected into the hole portions 1B of the rotor core 1A is cured. At a time t17 at which the resin has securely been cured, the process proceeds to the cooling step to cool the rotor core 1A until a time t18. In the manner described above, the steps for injecting the resin into the hole portions 1B of the rotor core 1A and fixing the magnets 1M are finished.

In the method for heating the rotor core 1A in the related art described above, the period until the temperature of the rotor core 1A exceeds the curing start temperature T3 of the resin at the time t15 after the injection of the resin into the hole portions 1B of the rotor core 1A is started at the time t13 is a period IS in which the molten resin stays in the hole portions 1B (hereinafter referred to as "molten resin stay period"). The resin may leak between the stacked steel sheets 1a as indicated by a symbol "X" in the middle particularly because the molten resin stay period TS is long. In the first embodiment, the resin is prevented from leaking between the stacked steel sheets 1a by changing the method for heating the rotor core 1A as described below.

Next, a method for heating the rotor core according to the first embodiment will be described with reference to FIG. 16. As shown in FIG. 16, when the temperature increasing step S4 (see FIG. 1) for heating the rotor core 1A is started at a time t1, the rotor core temperature Tc is the room temperature and the temperature Tr of the resin being heated and melted (whose temperature is increased) in the resin injector 40 is a temperature (for example, 80° C.) higher than the melting start temperature II (for example, and lower than the curing start temperature 13 in the first embodiment as in the related art. The resin that is fixed at the room temperature can be injected into the hole portions 1B of the rotor core 1A.

In the temperature increasing step S4 in the first embodiment, the temperature of the rotor core 1A is increased to a heating temperature T4 (for example, 150° C.) that is a first temperature higher than the curing start temperature 13 of the resin (for example, 120° C.). Therefore, the rotor core temperature Tc, exceeds the melting start temperature T1 at a time t2, and exceeds the injection temperature T2 that is a second temperature at a time t3. At a time t4, the rotor core 1A is placed on the resin injection apparatus 30 (injection apparatus placement step S5), and the process proceeds to the resin injection step S6 to inject the resin from the resin injector 40 into the hole portions 1B of the rotor core 1A. Then, the resin temperature Tr of the resin injected into the hole portions 1B, in particular, a portion in contact with the hole portions 1B is increased by heating with the amount of heat of the rotor core 1A to the substantial heating temperature T4 while exceeding the curing start temperature 13 at a time t5.

Since the heat capacity of the metal rotor core 1A is much larger than the heat capacity of the resin injected into the hole portions 1B of the rotor core 1A, the rotor core temperature Tc may decrease only slightly (for example, about 0.1'C). Since the rotor core 1A is heated by, for example, the induction heaters 210 and 220, the rotor core 1A is not always heated evenly. However, it is only necessary that at least the hole portions 1B have the heating temperature T4 when the resin is injected in the resin injection step S6. Specifically, the hole portions 1B may particularly be heated so as to have a temperature slightly higher than the heating temperature T4 in consideration of the fact that the rotor core 1A is slightly cooled during an elapsed period until the resin is injected in the resin injection step S6 after the injection apparatus placement step S5 in which the rotor core 1A is taken out from the heating device and placed on the resin injection apparatus 30.

When the resin injection step S6 is finished at a time t6, the rotor core 1A is detached from the resin injection apparatus 30, and the process proceeds to the magnet fixing step S7 to reheat the rotor core 1A by the heating device 200 to the fixing temperature T5 that is a third temperature higher than the heating temperature T4 (for example, 150° C.) and wait until the predetermined period elapses so that the resin injected into the hole portions 1B of the rotor core 1A is securely cured. At a time t7 at which the resin has securely been cured, the process proceeds to the cooling step S9 to detach the holding jig 10 and cool the rotor core 1A until a time t8. In the manner described above, the steps for injecting the resin into the hole portions 1B of the rotor core 1A and fixing the magnets 1M are finished in the first embodiment.

In the method for heating the rotor core 1A according to the present embodiment described above, the period until the temperature of the rotor core 1A exceeds the curing start temperature T3 of the resin at the time t5 after the injection of the resin into the hole portions 1B of the rotor core 1A is started at the time t4 is the molten resin stay period TS. The molten resin stay period TS is shorter than the molten resin stay period TS in the related art, and the resin injected into the hole portions 1B starts to be cured from the portion in contact with the hole portions 1B heated to the heating temperature T4, thereby preventing the resin from leaking between the stacked steel sheets 1a.

In the first embodiment, the resin injection step S6 is performed with the rotor core temperature Tc being the heating temperature T4 (for example, 150° C.) higher than the curing start temperature T3 (for example, 120° C.). Therefore, the resin temperature Tr is also increased to the substantial heating temperature T4 over the curing start temperature T3 by heating with the amount of heat of the rotor core 1A. Thus, the resin is cured as it is. By providing the magnet fixing step S7 from the time t6 to the time t7, the resin is securely cured, and the magnets 1M can securely be fixed to the hole portions 1B of the rotor core 1A by the resin. In the magnet fixing step S7, the rotor core 1A is heated to increase the temperature to the fixing temperature T5 (for example, 170° C.) higher than the heating temperature 14 (for example, 150° C.). Therefore, the resin curing period can securely be shortened, and the overall period can be shortened even in consideration of the cooling period of the rotor core 1A in the subsequent cooling step S9.

Second Embodiment

Figure 18:
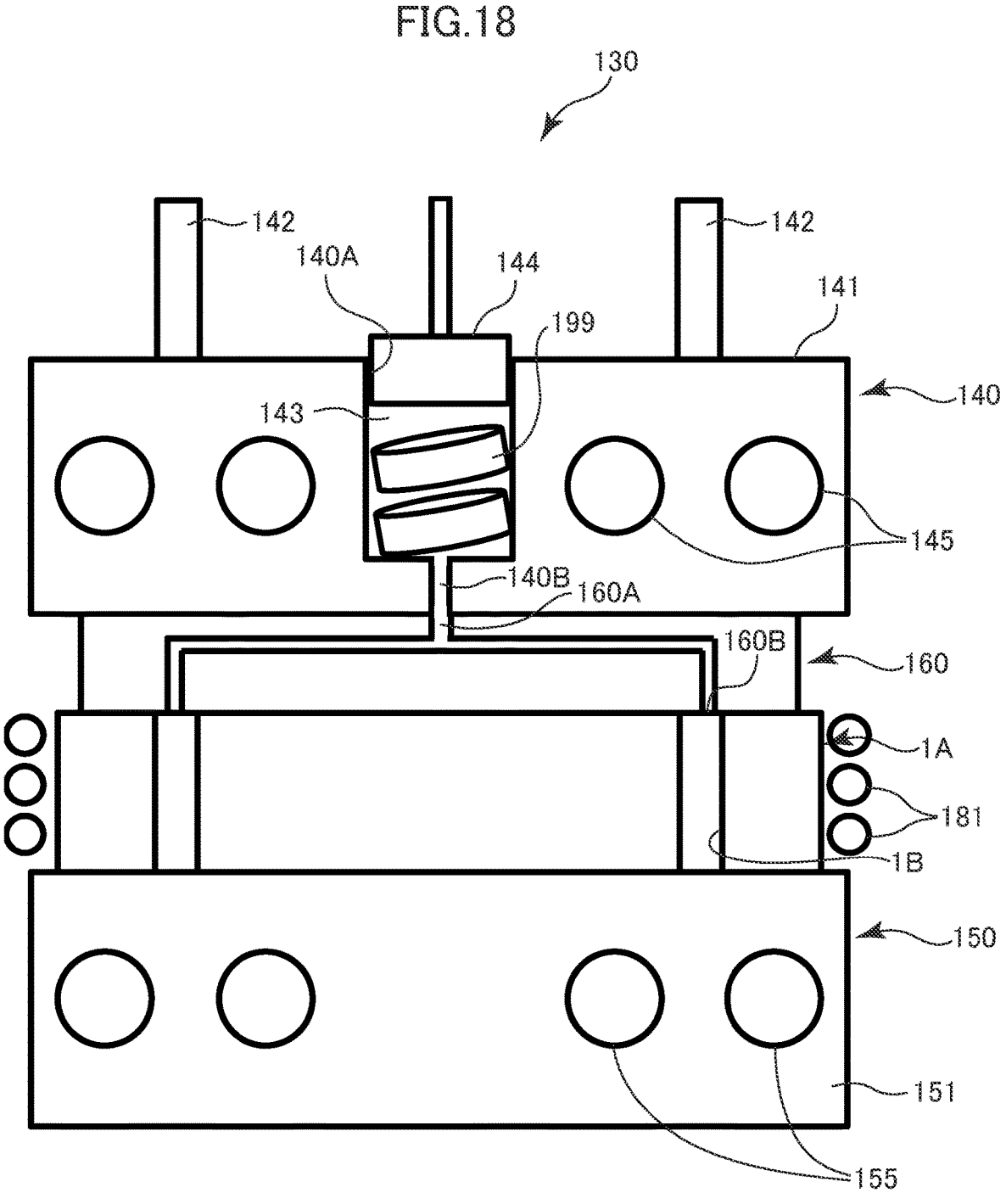
FIG. 18 is a schematic sectional view showing a resin injection apparatus according to a second embodiment.

Next, a second embodiment in which the first embodiment is partially modified will be described with reference to FIG. 18. In the second embodiment, the resin is injected into the hole portions 1B of the rotor core 1A by using a transfer molding resin injection apparatus 130.

Specifically, the resin injection apparatus 130 broadly includes a resin injector 140, a runner 160, and a placement table 150. The resin injector 140 is a so-called transfer molding machine in which a body 141 is vertically movable along a plurality of shafts 142 to press the rotor core 1A against the placement table 150 via the runner 160. The body 141 has a resin pod 143 (transfer chamber) into which resin tablets 199 are charged through a charging port 140A, and includes a plunger 144 that presses the resin melted in the resin pod 143 under a high pressure to eject the resin from an ejection port 140B. The body 141 includes a heating wire 145 serving as a heat application unit (disposed inside the resin injection apparatus 130). The temperature can be increased by heating the body 141 and the plunger 144 with electric power supplied from a heating device (not shown).

The runner 160 has a charging port 160A connected to the ejection port 140B of the resin injector 140, and a plurality of ejection ports 160B disposed so as to face the hole portions 1B of the rotor core 1A by branching the channel from the charging port 160A. The placement table 150 includes a heating wire 155 serving as a heat application unit (disposed inside the resin injection apparatus 130). The temperature can be increased by heating the rotor core 1A from the bottom with electric power supplied from the heating device (not shown). An IH coil 181 is disposed on the outer periphery of the rotor core 1A. The rotor core 1A can be heated from the side by a high-frequency electromagnetic wave supplied from the heating device (not shown). The runner 160 may serve as an upper die above the rotor core 1A, and the placement table 150 may serve as a lower die below the rotor core 1A.

Next, description will be given of steps for injecting the resin into the hole portions 1B of the rotor core 1A and curing the resin by the resin injection apparatus 130 structured as described above. First, in the temperature increasing step, the heating device (not shown) outside the resin injection apparatus 130 increases the temperature of the rotor core 1A to the curing start temperature of the resin or higher. Before the resin tablets 199 are charged into the resin pod 143, the body 141 of the resin injector 140 is heated by the heating wire 145 to increase the temperature to the curing start temperature or higher.

In the injection apparatus placement step, the rotor core 1A having the temperature equal to or higher than the curing start temperature is placed on the placement table 150 of the resin injection apparatus 130, the runner 160 is attached to the body 141, and the body 141 is caused to descend. Thus, the rotor core 1A is pressed by the runner 160 and the placement table 150 in the stacking direction of the stacked steel sheets. In this state, the temperature of the rotor core 1A is increased by the heating wire 155 and the 114 coil 181 of the resin injection apparatus 130 and kept at the curing start temperature of the resin or higher. The body 141 is heated by the heating wire 145 to increase and keep the temperature of the body 141 (resin injector 140) at the curing start temperature of the resin or higher. Although the temperature of the rotor core 1A is preferably increased to the curing start temperature or higher in the temperature increasing step, the temperature of the rotor core 1A may be increased to the curing start temperature or higher by the resin injection apparatus 130 after the injection apparatus placement step.

In the resin injection step, the resin tablets 199 that are solid at room temperature are charged into the charging port 140A of the resin injector 140. The resin tablets 199 are melted into liquid with the heat of the resin pod 143 and the plunger 144, and the resin is ejected to the runner 160 under a high pressure by the plunger 144. The liquid resin is ejected into the hole portions 1B of the rotor core 1A from the ejection ports 160B of the runner 160. At this time, the temperature of the body 141 is increased to the curing start temperature of the resin or higher, but the resin is melted and ejected at a timing before curing. Therefore, the resin does not basically remain uncured on the resin injector 140.

Then, the temperature of the resin ejected and injected into the hole portions 1B of the rotor core 1A is increased to the vicinity of the curing start temperature (semi-cured state). The resin curing is started when the resin comes into contact with the side surfaces of the hole portions 1B of the rotor core 1A heated to the curing start temperature or higher. Therefore, the resin is prevented from leaking between the stacked steel sheets.

In the magnet fixing step in the second embodiment, the rotor core 1A is kept at the curing start temperature or higher by the heating wire 155 and the IH coil 181 while being placed on the resin injection apparatus 130. The curing of the resin injected into the hole portions 1B is completed, that is, the magnets 1M are fixed to the rotor core 1A. After the resin is cured to a certain degree, the rotor core to may be detached from the resin injection apparatus 130 and heated by a heating device (heat application unit) outside the resin injection apparatus 130 to keep the curing start temperature or higher. That is, the magnet fixing step for the rotor core 1A may be performed outside the resin injection apparatus 130.

In the second embodiment, description is given of the case where the temperatures of the body 141 and the plunger 144 of the resin injector 140 are increased to the curing start temperature or higher before the resin tablets 199 are charged. The temperatures of the body 141 and the plunger 144 may be increased to the melting start temperature or higher and lower than the curing start temperature. Also in this case, the resin tablets 199 are melted into liquid in the resin pod 143, and the resin starts to be cured when coming into contact with the side surfaces of the hole portions 1B of the rotor core 1A.

Other structures, operations, and effects in the second embodiment are the same as those in the first embodiment, and therefore description thereof will be omitted.

Third Embodiment

Next, a third embodiment in which the first embodiment is partially modified will be described with reference to FIG. 19. In the first embodiment, description has been given of the case where the temperature is increased by heating to the heating temperature 14 in the temperature increasing step S4 and is further increased by heating to the fixing temperature T5 when the magnet fixing step S7 is performed after the resin injection step S6 is finished (see FIG. 16). In the third embodiment, the temperature is increased by heating in the temperature increasing step S4 to the fixing temperature T5 at which the resin curing can be finished within a predetermined period (for example, 1 minute) after the resin has been injected in the resin injection step S6. No heating is performed in the resin injection step S6 and the magnet fixing step S7.

Figure 19:
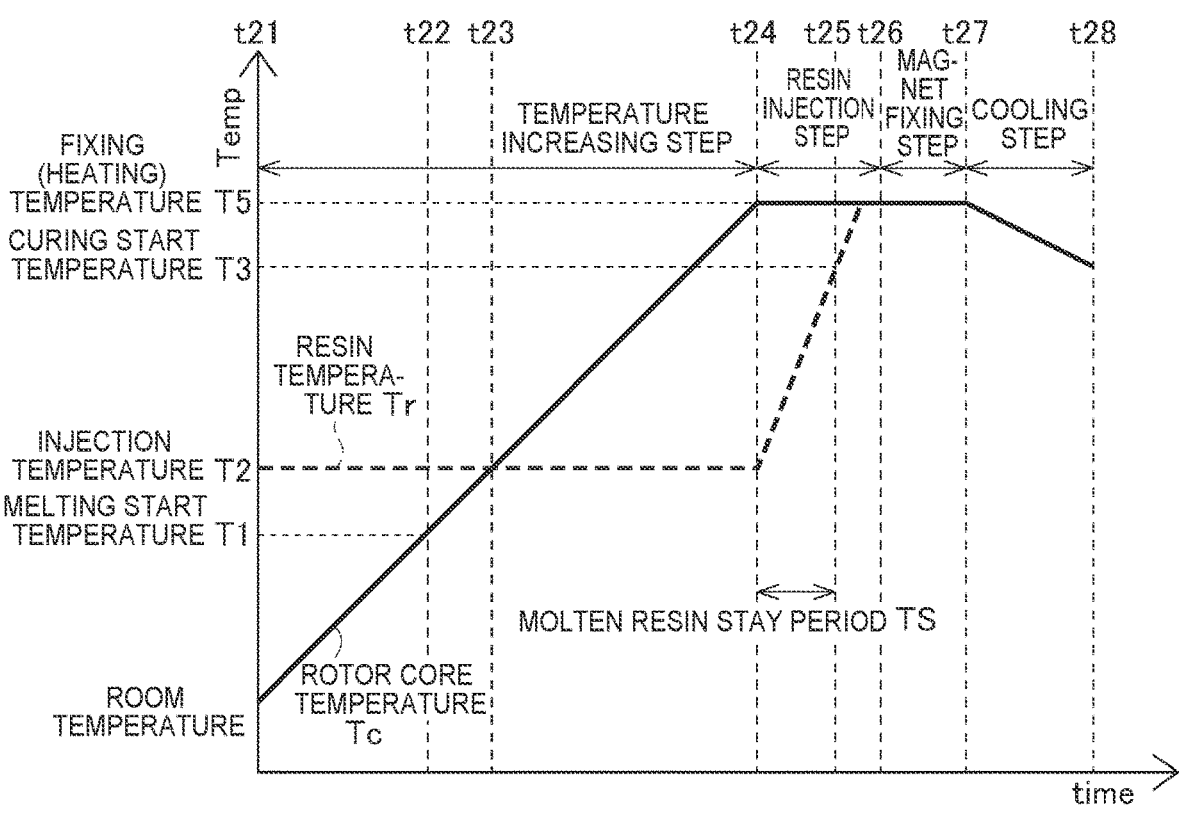
FIG. 19 is a time chart showing transition of the temperature of the rotor core and the temperature of the resin in each step according to a third embodiment.

Specifically, as shown in FIG. 19, when the temperature increasing step S4 (see FIG. 1) for increasing the temperature of the rotor core 1A is started at a time t21, the rotor core temperature Tc is the room temperature and the temperature Tr of the resin being melted with its temperature increased in the resin injector 40 is a temperature (for example, higher than the melting start temperature T1 (for example, 60° C.) and lower than the curing start temperature 13. The resin that is fixed at the room temperature can be injected into the hole portions 1B of the rotor core 1A.

In the temperature increasing step S4 in the third embodiment, the temperature of the rotor core 1A is increased to the fixing temperature T5 (for example, 170° C.) higher than the curing start temperature T3 of the resin (for example, 120° C.) and higher than the heating temperature T4 (for example, 150° C.) (see FIG. 16). Therefore, the rotor core temperature Tc exceeds the melting start temperature T1 at a time t22, and exceeds the injection temperature T2 that is the second temperature at a time t23. At a time t24, the rotor core 1A is placed on the resin injection apparatus 30 (injection apparatus placement step S5), and the process proceeds to the resin injection step S6 to inject the resin from the resin injector 40 into the hole portions 1B of the rotor core 1A. Then, the resin temperature Tr of the resin injected into the hole portions 1B, in particular, a portion in contact with the hole portions 1B is increased by heating with the amount of heat of the rotor core 1A to the substantial fixing temperature T5 while exceeding the curing start temperature T3 at a time t25.

When the resin injection step S6 is finished at a time t26, the rotor core 1A is detached from the resin injection apparatus 30, and the process proceeds to the magnet fixing step S7 to keep the fixing temperature T5 without heating the rotor core 1A until the predetermined period (for example, 1 minute) elapses after the resin has been injected in the resin injection step S6, that is, wait until the predetermined period elapses so that the resin injected into the hole portions 1B of the rotor core 1A is securely cured. At a time t27 at which the resin has securely been cured, the process proceeds to the cooling step S9 to detach the holding jig 10 and cool the rotor core 1A until a time t28. In the manner described above, the steps for injecting the resin into the hole portions 1B of the rotor core 1A and fixing the magnets 1M are finished in the third embodiment.

In the third embodiment, the temperature increasing of the rotor core 1A can be omitted in the magnet fixing step S7, and there is no need to return the rotor core 1A to the heating device 200 that has performed the temperature increasing step S4 by reversing the manufacturing line in order to, for example, perform the magnet fixing step S7. Thus, the productivity can be improved.

Other structures, operations, and effects in the third embodiment are the same as those in the first embodiment, and therefore description thereof will be omitted.

Summary of Present Embodiment

The rotor manufacturing method described above is a rotor manufacturing method for manufacturing a rotor (1) of a rotary electric machine by using a thermosetting resin having a characteristic that the resin is solid at room temperature, liquefied by being heated to a melting start temperature (T1) or higher, and cured by being heated to a curing start temperature (T3) or higher, disposing magnet members (1M) in hole portions (1B) of a rotor core (1A) formed of stacked steel sheets (1a), and injecting and curing the resin to fix the magnet members (1M) to the rotor core (1A), the rotor manufacturing method including:

a temperature increasing step (S4) for increasing a temperature of the rotor core (1A) to the curing start temperature (T3) or higher;

a resin injection step (S6) for causing a resin injection apparatus (30, 130) to inject the liquid resin at the melting start temperature (T1) or higher into the hole portions (1B) of the rotor core (1A) at the curing start temperature (T3) or higher; and a magnet fixing step (S7) for curing the resin by keeping the rotor core (1A) at the curing start temperature (T3) or higher.

When the resin is injected into the hole portions 1B of the rotor core 1A, the resin in contact with the hole portions 1B is cured at the curing start temperature T3 or higher. Thus, the resin can be prevented from leaking between the stacked steel sheets 1a.

In the rotor manufacturing method, in the temperature increasing step (S4), the temperature of the rotor core (1A) is increased to a heating temperature (T4) equal to or higher than the curing start temperature (T3), and in the magnet fixing step (S7), the temperature of the rotor core (1A) is increased to a fixing temperature (T5) that is higher than the heating temperature (T4) and is a temperature at which curing of the resin is finishable within a predetermined period after injection of the resin is finished in the resin injection step (S6).

Thus, the temperature of the rotor core 1A can be set to the heating temperature T4 in the resin injection step S6, and the progress of the curing of the resin can be slowed down as compared with, for example, a case where the temperature of the rotor core 1A is increased to the fixing temperature T5. The injection of the resin can be facilitated even when, for example, the hole portion 1B is long.

In the rotor manufacturing method, heat application units configured to heat the rotor core (1A) in the temperature increasing step (S4) and the magnet fixing step (S7) are provided outside the resin injection apparatus (30, 130), and a heat application unit configured to heat the resin to the melting start temperature (T1) or higher in the resin injection step (S6) is provided inside the resin injection apparatus (30, 130).

Since the temperature of the resin injection apparatus 30 (130) is not the curing start temperature T3 or higher, the resin is not cured inside the resin injector 40 (140). Thus, the yield of the resin material can be improved.

In the rotor manufacturing method, the heat application units configured to heat the rotor core (1A) in the temperature increasing step (S4) and the magnet fixing step (S7) are the same heat application unit.

Thus, it is possible to simplify the equipment for heating the rotor core 1A.

In the rotor manufacturing method, in the temperature increasing step (S4), the temperature of the rotor core (1A) is increased to a fixing temperature (T5) at which curing of the resin is finishable within a predetermined period after injection of the resin is finished in the resin injection step (S6), and the rotor core (1A) is not heated in the magnet fixing step (S7).

Thus, the heating of the rotor core 1A can be omitted in the magnet fixing step S7, and there is no need to return the rotor core 1A to the heating device that has performed the temperature increasing step S4 by reversing the manufacturing line in order to, for example, perform the magnet fixing step S7. Thus, the productivity can be improved.

In the rotor manufacturing method, a heat application unit configured to heat the rotor core (1A) in the temperature increasing step (S4) is provided outside the resin injection apparatus (30, 130), and a heat application unit configured to heat the resin to the melting start temperature (T1) or higher in the resin injection step (S6) is provided inside the resin injection apparatus (30, 130).

Since the temperature of the resin injection apparatus 30 (130) is not the curing start temperature T3 or higher, the resin is not cured inside the resin injector 40 (140). Thus, the yield of the resin material can be improved.

In the rotor manufacturing method, in the resin injection step (S6), the resin is injected in a state in which the rotor core (1A) is pressed in a stacking direction of the stacked steel sheets (1a).

When the resin is injected into the hole portions 1B of the rotor core 1A, the resin leakage between the stacked steel sheets 1a in the hole portions 1B can further be suppressed in conjunction with the curing of the resin in contact with the hole portions 1B.

The rotor manufacturing method further includes a jig attaching step (S3) for disposing the stacked steel sheets (2a) in a holding jig (10) and disposing the magnet members (1M) in the hole portions (1B) of the rotor core (1A) before the temperature increasing step (S4).

Since the holding jig 10 is attached before the rotor core 1A is heated, it is possible to set, by the holding jig 10, a state in which a pressing force is applied in consideration of thermal expansion in the stacking direction of the rotor core 1A.

In the rotor manufacturing method, the holding jig (10) includes a first plate (11), and a second plate (12) having resin injection holes (12c), and the first plate (11) and the second plate (12) press the rotor core (1A) in surface contact with the stacked steel sheets (1a) at both ends in the stacking direction.

Thus, the periphery of the hole portions 1B of the rotor core 1A can be pressed. Accordingly, it is possible to further increase the effect that the resin is prevented from leaking between the stacked steel sheets 1a in the hole portions 1B.

In the rotor manufacturing method, in the resin injection step (S6), the solid resin is charged into the resin injection apparatus (130) at the curing start temperature (T3) or higher, caused to pass while being melted, and injected into the hole portions (1B) of the rotor core (1A) at the curing start temperature (T3) or higher.

Thus, the process from the resin injection to the resin curing can be performed in a short period, and the resin curing can be completed before the resin leaks between the stacked steel sheets 1a in the hole portions 1B.

In the rotor manufacturing method, a heat application unit configured to heat the rotor core (1A) in the temperature increasing step (S4) is provided outside the resin injection apparatus (130).

Thus, it is possible to stably perform the temperature control on the rotor core 1A in the temperature increasing step S4.

Possibilities of Other Embodiments

In the first and second embodiments described above, description has been given of the example in which the temperature of the rotor core 1A is increased by heating to the heating temperature T4 of, for example, 150° C. in the temperature increasing step S4. This value can be changed as appropriate. That is, when the heating temperature T4 after the temperature of the rotor core 1A is increased in the temperature increasing step S4 is higher than the curing start temperature 13 of the resin, the object can be achieved in that the resin starts to be cured in contact with the hole portions 1B when the resin is injected. If the resin curing is fast when the resin is injected into the hole portions 1B, however, the resin cured before the hole portions 1B are completely filled with the resin is an obstacle. Therefore, the excessively high heating temperature T4 is not satisfactory. For example, the heating temperature 14 is preferably set to about 160° C. or lower.

In the first and second embodiments, description has been given of the example in which the temperature of the resin is increased in the resin injector 40 or 140 to the injection temperature T2 of, for example, 80° C. This value can also be changed as appropriate. That is, it is necessary to set a temperature equal to or higher than the melting start temperature T1 (for example, 60° C.) at which the resin is melted into liquid in that the resin can be injected into the hole portions 1B, and to set a temperature lower than the curing start temperature T3 so that the resin is not cured. The temperature of the resin injected into the hole portions 1B of the rotor core 1A is increased with the amount of heat of the rotor core 1A whose temperature is increased. That is, the resin temperature Tr is increased rapidly. Therefore, the injection temperature T2 is preferably set in consideration of this fact. The injection temperature T2 is set high because the temperature of the injected resin is not easily increased as the heating temperature T4 of the rotor core 1A decreases. Conversely, the injection temperature T2 is set low because the temperature of the injected resin is easily increased as the heating temperature T4 of the rotor core 1A increases.

In the first and second embodiments, description has been given of the example in which the temperature of the rotor core LA is increased to the fixing temperature T5 of, for example, 170° C. in the magnet fixing step S7. This value can also be changed as appropriate. That is, when the fixing temperature 15 is set higher than the heating temperature 14, the object can be achieved in that an effect of accelerating the resin curing is obtained. If the temperature of the rotor core 1A is excessively high, however, thermal strain or the like may occur. Further, the time shortening effect is small because of the long heating period. Therefore, the fixing temperature 15 is preferably set to, for example, about 185° C. or lower.

In the first embodiment, description has been given of the case where the holding jig 10 broadly includes the lower plate 11, the pressing plate 12, the upper plate 13, and the coil springs 23. However, the present disclosure is not limited to this case. Any structure may be used as long as the rotor core 1A can be interposed and held in the stacking direction.

In the first embodiment, description has been given of the case where the holding jig 10 is also cooled by the cooling device in the cooling step S9. However, the present disclosure is not limited to this case. The holding jig 10 may be cooled naturally. In particular, many holding jigs 10 may be prepared so that the natural cooling suffices even if the holding jigs 10 are reused.

In the first embodiment, description has been given of the case where the rotor core 1A (rotor 1) is cooled by the cooling device in the cooling step S9. However, the present disclosure is not limited to this case. As a matter of course, the cooling period can be shortened by detaching the holding jig 10 even if the rotor core 1A is cooled naturally.

In the first embodiment, description has been given of the case where the injection hole 12c in which the resin plate portion 99a and the conical portion 99b are formed is formed in the pressing plate 12 of the holding jig 10 serving as an abutment member. However, the present disclosure is not limited to this case. There may be a case where the holding jig 10 is not used, such as a case where the resin is injected while holding the rotor core 1A by another method instead of holding the rotor core 1A by using the holding jig 10. In this case, the injection hole in which the resin plate portion 99a and the conical portion 99b are formed may be formed in a different plate or the like that abuts against the rotor core 1A.

In the first embodiment, description has been given of the case where the resin plate portion 99a and the conical portion 99b are formed at the injection hole 12c, but these shapes may be any shapes. That is, the shape formed so as to protrude from the upper surface of the rotor core 1A at the enlarged opening portion may be, for example, a triangular pyramid shape, a square pyramid shape, a conical shape, or a hemispherical shape instead of the plate shape. The shape formed at the tapered portion may be, for example, a triangular pyramid shape, a square pyramid shape, a conical shape, or a hemispherical shape instead of the conical shape.

In the first embodiment, description has been given of the case where the runner 60 is detachably supported on the table portion 50. However, the runner 60 may directly be fixed to and supported on, for example, the nozzle portion 42 of the resin injector 40. Further, the runner 60 may be supported on a member other than the table portion 50.

In the first embodiment, description has been given of the case where the rotor core 1A is placed on the placement table 55 and caused to ascend toward the runner 60 so that the ejection ports 60B face the hole portions 1B of the rotor core 1A via the injection holes 12c. However, the present disclosure is not limited to this case. The rotor core 1A may be moved in any direction depending on the orientations of the resin injector 40 and the runner 60. That is, any structure may be used as long as the resin injector 40 and the runner 60 are not moved at least in the resin injection step S6.

In the first embodiment, description has been given of the case where the temperature control device 81 controls the temperature of the resin injector 40 and the temperature control device 82 controls the temperature of the runner 60. However, the present disclosure is not limited to this case. For example, a single temperature control device may perform the temperature control. Conversely, more temperature control devices may be used to subdivide the temperature control on the resin injector 40 and the runner 60.

INDUSTRIAL APPLICABILITY

The rotor manufacturing method can be used when manufacturing a rotor of a rotary electric machine, and is particularly suitable for use in a case requiring prevention of resin leakage between stacked steel sheets when the resin is injected into hole portions of a rotor core.

DESCRIPTION OF THE REFERENCE NUMERALS

1 . . . rotor
1a . . . stacked steel sheet
1A . . . rotor core
1B . . . hole portion
1M . . . magnet member (magnet)
10 holding jig
11 . . . first plate (lower plate)
12 . . . second plate (pressing plate)
12c . . . resin injection hole (injection hole)
30 . . . resin injection apparatus
130 . . . resin injection apparatus
S3 jig attaching step
S4 . . . temperature increasing step
S6 . . . resin injection step
S7 . . . magnet fixing step
T1 . . . melting start temperature
T3 . . . curing start temperature
T4 . . . heating temperature
T5 . . . fixing temperature

The invention claimed is:

1. A rotor manufacturing method for manufacturing a rotor of a rotary electric machine by using a thermosetting resin having a characteristic that the thermosetting resin is solid at room temperature, liquefied by being heated to a melting start temperature or higher, and cured by being heated to a curing start temperature or higher, disposing magnet members in hole portions of a rotor core formed of stacked steel sheets, and injecting and curing the thermosetting resin to fix the magnet members to the rotor core, the rotor manufacturing method comprising:

a temperature increasing step for increasing a temperature of the rotor core to the curing start temperature or higher;

a resin injection step for causing a resin injection apparatus to inject the thermosetting resin in liquid state at the melting start temperature or higher and lower than the curing start temperature into the hole portions of the rotor core at the curing start temperature or higher after the temperature in creasing step; and a magnet fixing step for curing the thermosetting resin by keeping the rotor core at the curing start temperature or higher, wherein:

in the temperature increasing step, the temperature of the rotor core is increased to a heating temperature equal to or higher than the curing start temperature, in the magnet fixing step, the temperature of the rotor core is increased to a fixing temperature that is higher than the heating temperature and is a temperature at which curing of the thermosetting resin is finishable within a predetermined period after injection of the thermosetting resin in liquid state is finished in the resin injection step, heat application units configured to heat the rotor core in the temperature increasing step and the magnet fixing step are provided outside the resin injection apparatus, the heat application units being configured to heat the rotor core in the temperature increasing step and the magnet fixing step are a same heat application unit, and a heat application unit configured to heat the thermosetting resin to the melting start temperature or higher in the resin injection step is provided inside the resin injection apparatus.

2. The rotor manufacturing method according to claim 1, wherein in the resin injection step, the thermosetting resin in liquid state is injected in a state in which the rotor core is pressed in a stacking direction of the stacked steel sheets.

3. The rotor manufacturing method according to claim 2, further comprising a jig attaching step for disposing the stacked steel sheets in a holding jig and disposing the magnet members in the hole portions of the rotor core before the temperature increasing step.

4. The rotor manufacturing method according to claim 3, wherein the holding jig includes a first plate, a second plate having resin injection holes, and the first plate and the second plate press the rotor core in surface contact with the stacked steel sheets at both ends in the stacking direction.

* * * * *